US012656158B2

(12) United States Patent
Kirst et al.

(10) Patent No.: US 12,656,158 B2
(45) Date of Patent: Jun. 16, 2026

(54) VIBRONIC MEASURING SYSTEM

(71) Applicant: Endress+Hauser Flowtec AG, Reinach (CH)

(72) Inventors: Michael Kirst, Lörrach (DE); Alfred Rieder, Landshut (DE)

(73) Assignee: Endress+Hauser Flowtec AG, Reinach (CH)

( * ) Notice: Subject to any disclaimer, the term of this patent is extended or adjusted under 35 U.S.C. 154(b) by 700 days.

(21) Appl. No.: 18/002,244

(22) PCT Filed: Jun. 15, 2021

(86) PCT No.: PCT/EP2021/066125
§ 371 (c)(1),
(2) Date: Dec. 16, 2022

(87) PCT Pub. No.: WO2021/255034
PCT Pub. Date: Dec. 23, 2021

(65) Prior Publication Data
US 2023/0341247 A1 Oct. 26, 2023

(30) Foreign Application Priority Data

Jun. 18, 2020 (DE) ..................... 10 2020 116 185.9
Jul. 15, 2020 (DE) ..................... 10 2020 118 702.5

(51) Int. Cl.
*G01F 1/84* (2006.01)
*G01F 25/10* (2022.01)

(52) U.S. Cl.
CPC .......... *G01F 1/8431* (2013.01); *G01F 1/8436* (2013.01); *G01F 25/10* (2022.01)

(58) Field of Classification Search
CPC ....... G01F 1/8431; G01F 1/8436; G01F 25/10
See application file for complete search history.

(56) References Cited

U.S. PATENT DOCUMENTS 4,680,974 A 7/1987 Simonsen et al.
4,738,144 A 4/1988 Cage et al.
(Continued)

FOREIGN PATENT DOCUMENTS

CN 101023325 A1 8/2007
CN 103534558 A1 1/2014
(Continued)

*Primary Examiner* — Kristina M Deherrera
(74) *Attorney, Agent, or Firm* — Christopher R. Powers; Endress+Hauser (USA) Holding, Inc.

(57) ABSTRACT

A measuring system includes a vibration-type transducer including a flow tube and electronics coupled to the transducer for controlling the transducer and evaluating vibration measurement signals from the transducer, which includes a vibration exciter positioned and configured such that a drive offset between a drive cross-sectional area of the tube and a predefined reference cross-sectional area of the tube is no more than 3 mm and/or less than 0.5% of a tube length, wherein a vibration node between two vibration antinodes of vibration movements of the tube in a second or higher order lies within the reference cross-sectional area, wherein the electronics are configured to feed a drive signal to the vibration exciter such that the tube performs forced mechanical vibrations, the drive signal including current components, which deviate from resonant frequencies of vibration modes of the tube by less than 1% and/or by less than 1 Hz.

50 Claims, 7 Drawing Sheets

(56) References Cited

U.S. PATENT DOCUMENTS

| | | | |
|---|---|---|---|
| 4,768,384 A | 9/1988 | Flecken et al. |
| 4,777,833 A | 10/1988 | Carpenter |
| 4,793,191 A | 12/1988 | Flecken et al. |
| 4,801,897 A | 1/1989 | Flecken |
| 4,823,614 A | 4/1989 | Dahlin |
| 4,831,885 A | 5/1989 | Dahlin |
| 4,879,911 A | 11/1989 | Zolock |
| 5,009,109 A | 4/1991 | Kalotay et al. |
| 5,024,104 A | 6/1991 | Dames |
| 5,027,662 A | 7/1991 | Titlow et al. |
| 5,050,439 A | 9/1991 | Thompson |
| 5,291,792 A | 3/1994 | Hussain et al. |
| 5,359,881 A | 11/1994 | Kalotay et al. |
| 5,398,554 A | 3/1995 | Ogawa et al. |
| 5,476,013 A | 12/1995 | Hussain et al. |
| 5,531,126 A | 7/1996 | Drahm |
| 5,602,345 A | 2/1997 | Wenger et al. |
| 5,691,485 A | 11/1997 | Endo et al. |
| 5,728,952 A | 3/1998 | Yao et al. |
| 5,734,112 A | 3/1998 | Bose |
| 5,796,010 A | 8/1998 | Kishiro et al. |
| 5,796,011 A | 8/1998 | Kishiro et al. |
| 5,796,012 A | 8/1998 | Gomi et al. |
| 5,804,741 A | 9/1998 | Freeman |
| 5,831,178 A | 11/1998 | Yoshimura et al. |
| 5,861,561 A | 1/1999 | Van Cleve et al. |
| 5,869,770 A | 2/1999 | Yoshimura |
| 5,926,096 A | 7/1999 | Mattar et al. |
| 5,945,609 A | 8/1999 | Kashimura |
| 5,979,246 A | 11/1999 | Van Cleve et al. |
| 6,047,457 A | 4/2000 | Bitto et al. |
| 6,073,495 A | 6/2000 | Stadler |
| 6,092,429 A | 7/2000 | Cunningham et al. |
| 6,223,605 B1 | 5/2001 | Koudal et al. |
| 6,311,136 B1 | 10/2001 | Henry et al. |
| 6,330,832 B1 | 12/2001 | Normen et al. |
| 6,397,685 B1 | 6/2002 | Cook et al. |
| 6,513,393 B1 | 2/2003 | Eckert et al. |
| 6,557,422 B1 | 5/2003 | Kolahi |
| 6,651,513 B2 | 11/2003 | Wenger et al. |
| 6,666,098 B2 | 12/2003 | Drahm et al. |
| 6,691,583 B2 | 2/2004 | Rieder et al. |
| 6,840,109 B2 | 1/2005 | Drahm et al. |
| 6,868,740 B2 | 3/2005 | Hussain |
| 6,883,387 B2 | 4/2005 | Bitto et al. |
| 7,017,424 B2 | 3/2006 | Rieder et al. |
| 7,040,179 B2 | 5/2006 | Drahm et al. |
| 7,073,396 B2 | 7/2006 | Hussain et al. |
| 7,077,014 B2 | 7/2006 | Rieder et al. |
| 7,080,564 B2 | 7/2006 | Rieder et al. |
| 7,134,348 B2 | 11/2006 | Kolahi |
| 7,299,699 B2 | 11/2007 | Lorenz |
| 7,305,892 B2 | 12/2007 | Kourosh |
| 7,360,451 B2 | 4/2008 | Bitto et al. |
| 7,360,453 B2 * | 4/2008 | Rieder .................. G01F 1/8431 73/861.357 |
| 7,392,709 B2 | 7/2008 | Eckert |
| 7,406,878 B2 | 8/2008 | Rieder et al. |
| 7,562,586 B2 | 7/2009 | Rieder et al. |
| 9,052,225 B2 * | 6/2015 | Anklin-Imhof ....... G01F 1/8431 |
| 9,372,107 B2 | 6/2016 | Kirst et al. |
| 2005/0257347 A1 | 11/2005 | Tsuchiya |
| 2006/0000293 A1 | 1/2006 | Rieder et al. |
| 2006/0011277 A1 | 1/2006 | Koch |
| 2006/0112774 A1 | 6/2006 | Kolahi et al. |
| 2006/0266129 A1 | 11/2006 | Eckert |
| 2007/0062308 A1 | 3/2007 | Deppe |
| 2007/0113678 A1 | 5/2007 | Baker et al. |
| 2007/0119264 A1 | 5/2007 | Bitto et al. |
| 2007/0119265 A1 | 5/2007 | Bitto et al. |
| 2007/0151370 A1 | 7/2007 | Bitto et al. |
| 2007/0151371 A1 | 7/2007 | Bitto et al. |
| 2007/0186685 A1 | 8/2007 | Bitto et al. |
| 2008/0034893 A1 | 2/2008 | Stappert et al. |
| 2008/0041168 A1 | 2/2008 | Kolahi et al. |
| 2008/0141789 A1 | 6/2008 | Kassubek et al. |
| 2010/0011882 A1 | 1/2010 | Gebhardt et al. |
| 2010/0050783 A1 | 3/2010 | Hussain et al. |
| 2010/0101333 A1 | 4/2010 | Kirst |
| 2010/0139417 A1 | 6/2010 | Kolahi |
| 2010/0236338 A1 | 9/2010 | Bitto et al. |
| 2010/0242623 A1 | 9/2010 | Bitto et al. |
| 2010/0242624 A1 | 9/2010 | Bitto et al. |
| 2010/0251830 A1 | 10/2010 | Bitto et al. |
| 2011/0167907 A1 | 7/2011 | Bitto et al. |
| 2012/0123705 A1 | 5/2012 | Drahm et al. |
| 2014/0352454 A1 | 12/2014 | Huber et al. |
| 2016/0033314 A1 | 2/2016 | Huber et al. |
| 2016/0116319 A1 * | 4/2016 | Rensing ................ G01F 1/8436 73/861.357 |
| 2016/0123792 A1 | 5/2016 | Plaziak et al. |
| 2016/0123836 A1 | 5/2016 | Zhu et al. |
| 2016/0138997 A1 | 5/2016 | Zhu et al. |
| 2016/0349091 A1 | 12/2016 | Huber et al. |
| 2017/0030870 A1 | 2/2017 | Dual et al. |
| 2017/0356777 A1 | 12/2017 | Zhu et al. |
| 2019/0003875 A1 | 1/2019 | Natter et al. |
| 2020/0132529 A1 | 4/2020 | Rensing et al. |
| 2020/0393278 A1 | 12/2020 | Chatzikonstantinou |

FOREIGN PATENT DOCUMENTS

| | | | |
|---|---|---|---|
| CN | 105899917 A1 | 8/2016 |
| CN | 110114641 A1 | 8/2019 |
| DE | 102019124709 A1 | 3/2021 |
| EP | 0317340 A2 | 5/1989 |
| EP | 0816807 A2 | 1/1998 |
| EP | 02638367 A1 | 9/2013 |
| JP | 08136311 A | 5/1996 |
| WO | 8706691 A1 | 11/1987 |
| WO | 9301472 A1 | 1/1993 |
| WO | 9516897 A1 | 6/1995 |
| WO | 9529386 A1 | 11/1995 |
| WO | 9605484 A1 | 2/1996 |
| WO | 9608697 A2 | 3/1996 |
| WO | 9726508 A1 | 7/1997 |
| WO | 9902945 A1 | 1/1999 |
| WO | 9928708 A1 | 6/1999 |
| WO | 9939164 A1 | 8/1999 |
| WO | 9940394 A1 | 8/1999 |
| WO | 9944018 A1 | 9/1999 |
| WO | 0014485 A1 | 3/2000 |
| WO | 0102816 A2 | 1/2001 |
| WO | 03021205 A1 | 3/2003 |
| WO | 2004072588 A2 | 8/2004 |
| WO | 2005040734 A1 | 5/2005 |
| WO | 2005050145 A1 | 6/2005 |
| WO | 2006036139 A1 | 4/2006 |
| WO | 2007097760 A1 | 8/2007 |
| WO | 2008013545 A1 | 1/2008 |
| WO | 2008077574 A2 | 7/2008 |
| WO | 2009136943 A1 | 11/2009 |
| WO | 2011019345 A1 | 2/2011 |
| WO | 2013002759 A1 | 1/2013 |
| WO | 2013009307 A1 | 1/2013 |
| WO | 2017019016 A1 | 2/2017 |
| WO | 2017069749 A1 | 4/2017 |
| WO | 2019017891 A1 | 1/2019 |
| WO | 2019081169 A1 | 5/2019 |
| WO | 2019081170 A1 | 5/2019 |
| WO | 2020126285 A1 | 6/2020 |
| WO | 2020259762 A1 | 12/2020 |

* cited by examiner

1

VIBRONIC MEASURING SYSTEM

CROSS-REFERENCE TO RELATED APPLICATIONS

The present application is related to and claims the priority benefit of German Patent Application No. 10 2020 116 185.9, filed Jun. 18, 2020; German Patent Application No. 10 2020 118 702.5, filed Jul. 15, 2020; and of International Patent Application No. PCT/EP2021/066125, filed Jun. 15, 2021, the entire contents of which are incorporated herein by reference.

TECHNICAL FIELD

The invention relates to a vibronic measuring system, formed by means of a vibration-type transducer and a measuring system electronics unit electrically connected thereto, especially, a Coriolis mass flow measuring device or Coriolis mass flow/density measuring device, for measuring and/or monitoring at least one measured variable of a flowing measured substance, especially, viz., a gas, a liquid, or a dispersion. The measured variable may, for example, be a temporally variable flow parameter, e.g., a mass flow, a volumetric flow or a flow rate, and/or a temporally variable substance parameter, e.g., a density and/or a viscosity, of the respective measured substance.

BACKGROUND

Such measuring systems, typically designed as an in-line measuring device of compact design, have been known for a long time and have proven themselves in industrial use, not least also in the field of the regulation and monitoring of automated process engineering processes or process systems or in the field of transfer points of the goods traffic, which may also be subject to calibration. Examples of vibronic measuring systems of the type in question are, for example, described in EP-A 317 340, EP-A 816 807, JP-A 8-136311, JP-A 9-015015, DE-A 10 2019 124709, US-A 2005/0125167, US-A 2006/0000293, US-A 2006/0112774, US-A 2006/0266129, US-A 2007/0062308, US-A 2007/0113678, US-A 2007/0119264, US-A 2007/0119265, US-A 2007/0151370, US-A 2007/0151371, US-A 2007/0186685, US-A 2008/0034893, US-A 2008/0041168, US-A 2008/0141789, US-A 2010/0011882, US-A 2010/0050783, US-A 2010/0101333, US-A 2010/0139417, US-A 2010/0236338, US-A 2010/0242623, US-A 2010/0242624, US-A 2010/0251830, US-A 2011/0167907, US-A 2012/0123705, US-A 2014/0352454, US-A 2016/0033314, US-A 2016/0349091, US-A 2016/0123836, US-A 2016/0138997, US-A 2017/0030870, US-A 2017/0356777, US-A 2019/0003875, US-A 2020/0132529, US-A 2020/0393278, U.S. Pat. Nos. 4,680,974, 4,738,144, 4,768,384, 4,777,833, 4,793,191, 4,801,897, 4,823,614, 4,831,885, 4,879,911, 5,009,109, 5,024,104, 5,027,662, 5,050,439, 5,291,792, 5,359,881, 5,398,554, 5,476,013, 5,531,126, 5,602,345, 5,691,485, 5,728,952, 5,734,112, 5,796,010, 5,796,011, 5,796,012, 5,804,741, 5,831,178, 5,861,561, 5,869,770, 5,926,096, 5,945,609, 5,979,246, 6,047,457, 6,073,495, 6,092,429, 6,311,136, US-A 2010/0011882, US-A 2010/0139416, U.S. Pat. Nos. 6,223,605, 6,311,136, 6,330,832, 6,397,685, 6,513,393, 6,557,422, 6,651,513, 6,666,098, 6,691,583, 6,840,109, 6,868,740, 6,883,387, 7,017,424, 7,040,179, 7,073,396, 7,077,014, 7,080,564, 7,134,348, 7,299,699, 7,305,892, 7,360,451, 7,392,709, 7,406,878, 7,562,586, WO-A 00/14485, WO-A 01/02816, WO-A 03/021205, WO-A 2004/

2

072588, WO-A 2005/040734, WO-A 2005/050145, WO-A 2006/036139, WO-A 2007/097760, WO-A 2008/013545, WO-A 2008/077574, WO-A 2009/136943, WO-A 2011/019345, WO-A 2013/002759, WO-A 2013/009307, WO-A 2017/019016, WO-A 2017/069749, WO-A 2019/017891, WO-A 2019/081169, WO-A 2019/081170, WO-A 2020/259762, WO-A 2020/126285, WO-A 87/06691, WO-A 93/01472, WO-A 95/16897, WO-A 95/29386, WO-A 96/05484, WO-A 96/08697, WO-A 97/26508, WO-A 99/39164, WO-A 99/40394 or WO-A 99/44018 and have also been produced by the applicant for a long time and advertised as a Coriolis mass flow measuring device or as a Coriolis mass flow/density measuring device, for example under the trade name, "PROMASS G 100," "PROMASS O 100," "PROMASS E 200," "PROMASS F 300," "PRO-MASS X 500," "CNGmass," "LPGmass," or "Dosimass" (https://www.endress.com/de/search?filter.text=promass).

Each of the transducers of the measuring systems shown therein comprises at least one tube assembly for conducting the flowing measured substance, an exciter assembly for converting electrical power into mechanical power used to excite and maintain forced mechanical vibrations of the tube assembly, and a sensor assembly for detecting mechanical vibrations of the tube assembly and for providing vibration signals respectively representing vibration movements of the tube assembly. Both the exciter assembly and the sensor assembly are respectively electrically coupled to the measuring system electronics unit, which in turn is used to control the transducer, especially, viz., the exciter assembly thereof, and to receive and evaluate measurement signals supplied therefrom, especially, viz., vibration signals supplied from the sensor assembly thereof, especially, viz., to determine measured values representing the at least one measured variable. In order to protect against external influences, the tube assembly together with the exciter assembly and sensor assembly is accommodated in a typically metallic transducer protective housing, and the measuring system electronics unit is accommodated in a, for example, likewise metallic, electronics protective housing; the latter may also be held directly on the aforementioned transducer protective housing, forming, for example, a Coriolis mass flow measuring device or Coriolis mass flow/density measuring device of compact design. In the case of measuring systems shown in WO-A 96/08697 or WO-A 2019/017891, the transducer protective housing and the tube assembly are in particular detachably connected to one another again, e.g., in order to enable subsequent insertion of the tube assembly or replacement of a defective or worn tube assembly with an intact tube assembly on-site.

The aforementioned tube assemblies are each provided to be integrated into the course of a process line and each have at least one tube, for example, viz., exactly one tube or exactly two tubes or exactly four tubes, which in each case extends with a tube length from a respective first tube end to a respective second tube end and has a lumen which is enclosed by a, typically metallic, tube wall, and extends from the first tube end to the second tube end. Due to the measuring principle, the at least sectionally curved and/or at least sectionally straight tube is configured to be flowed through, at least in a flow direction from the first tube end to the second tube end, by the measured material which is fed or discharged again via the connected process line, and to be allowed to vibrate in the meantime, e.g., for the purpose of generating the mass flow-dependent Coriolis forces, inertial forces dependent upon the density of the measured substance, and/or frictional forces dependent upon the viscosity of the measured substance, for example, viz., in order to carry out flexural vibrations about a static resting position. The tubes of marketed (standard) measuring systems typically have at least two planes of symmetry orthogonal to one another and may, for example, have a U- or V- or a rectangular or triangular shape, and even more rarely also a $\Omega$ or helical shape. Moreover, the respective tube wall thereof typically consists of a steel, for example, viz., a stainless steel, duplex steel, or super duplex steel, of a titanium alloy, a zirconium alloy, e.g., a Zircaloy, and/or a tantalum alloy. The tube length of such tubes can be in a range between approximately 100 mm and approximately 2,000 mm, and a caliber (inner tube diameter) of such tubes can be in the range between approximately 0.1 mm and approximately 100 mm, typically in such a way that the respective tube has a caliber-to-tube-length ratio in the range between approximately 0.08 and 0.25.

In the case of transducers with a single tube, the latter usually communicates with the aforementioned process line via a substantially straight connecting tube piece opening into the inlet side and via a substantially straight connecting tube piece opening into the outlet side. Furthermore, the tube assembly of such transducers with a single tube respectively comprises at least one single-piece or multi-part, e.g., tubular, box-shaped, or plate-shaped counter-oscillator, which is coupled to the tube on the inlet side to form a first coupling zone and which is coupled to the tube on the outlet side to form a second coupling zone, and which substantially rests in operation or oscillates in opposition to the tube, i.e., at the same frequency and in phase opposition. The tube assembly of such a transducer formed by means of tube and counter-oscillator is usually held vibratably in the aforementioned transducer protective housing by means of the two connecting tube pieces via which the tube communicates with the process line during operation. In the case of the (standard) transducers shown, for example, in U.S. Pat. Nos. 5,291,792, 5,796,010, 5,945,609, 7,077,014, US-A 2007/0119264, WO-A 01/02816, or also WO-A 99/40394, with a single, substantially straight tube, the latter and the counter-oscillator are aligned substantially coaxially with one another, as is quite usual in conventional transducers. Comparatively cost-effective steel grades, such as construction steel or machining steel, are usually used as materials for the counter-oscillators, not least also when titanium, tantalum, or zirconium are used for the tube. In the case of transducers with two or more tubes, the respective tube assembly typically respectively has an inlet-side flow divider, which extends between the tubes and an inlet-side connecting flange, and has an outlet-side flow divider which extends between the tubes and an outlet-side connecting flange and via which the tube assembly can be integrated into the process line. The tube assemblies shown in US-A 2012/0123705, U.S. Pat. Nos. 5,602,345, 5,926,096, WO-A 2009/136943, WO-A 87/06691, WO-A 96/05484, WO-A 96/08697, WO-A 97/26508, WO-A 99/39164, or WO-A 2019/017891 respectively have two tubes, viz., a first tube and a second tube structurally identical and parallel thereto, as well as a first, or inlet-side, flow divider, used here as a line-branching unit, with exactly two flow openings and a second, or outlet-side, flow divider structurally identical to the first flow divider and used here as a line-merging unit, with exactly two flow openings, while tube assemblies shown in US-A 56 02 345, WO-A 96/08697, or US-A 2017/0356777 or WO-A 2019/081169 or WO-A 2019/081170 or the mentioned patent application PCT/EP2019/082044, respectively have a first, or inlet-side, flow divider, used here as a line-branching unit, with exactly two flow openings, a second, or outlet-side, flow divider structurally identical to the first flow divider and used here as a line-merging unit, with exactly two flow openings, as well as two tubes, viz., a first tube as well as a second tube. Moreover, each of the two or four tubes is respectively connected to each of the first and second flow dividers in such a way that the first tube opens with its first end into a first flow opening of the first flow divider and with its second end into a first flow opening of the second flow divider, the second tube opens with its first end into a second flow opening of the first flow divider and with its second end into a second flow opening of the second flow divider or that the first tube opens with its first end into a first flow opening of the first flow divider and with its second end into a first flow opening of the second flow divider, the second tube opens with its first end into a second flow opening of the first flow divider and with its second end into a second flow opening of the second flow divider, the third tube opens with its first end into a third flow opening of the first flow divider and with its second end into a third flow opening of the second flow divider, and the fourth tube opens with its first end into a fourth flow opening of the first flow divider and with its second end into a fourth flow opening of the second flow divider. Moreover, the flow dividers of marketed transducers are typically designed as an integral component of the aforementioned transducer protective housing.

In order to generate vibration signals that are influenced by the measured variable to be measured or correspond thereto accordingly, the at least one tube of the transducer is actively excited during operation of the measuring system by means of the exciter assembly to vibrate in a vibration form suitable for the measurement of the respective measured variable or for the generation of the aforementioned Coriolis, inertial, or frictional forces and occasionally also referred to as driving mode or useful mode, and the corresponding vibration responses, viz., the resulting vibration movements of the at least one tube, are detected simultaneously by means of the sensor assembly.

For exciting mechanical vibrations of the at least one tube, the exciter assemblies have at least one electromechanical, typically viz., electrodynamic, vibration exciter, which is mechanically connected partially to the tube and is configured to provide electrical power with a temporally-variable electrical current into mechanical power in such a way that a temporally-variable drive force acts on the tube at a drive point formed by means of the vibration exciter on the tube mechanically connected thereto. In the aforementioned case, in which the tube assembly has at least one further (second) tube, the at least one vibration exciter can moreover be partially also fastened thereto in such a way that the vibration exciter differentially acts on the two tubes. For the other aforementioned case in which the tube assembly has a counter-oscillator, the vibration exciter can be partially fastened thereto in such a way that the vibration exciter differentially acts on tube and counter-oscillator. However, the vibration exciter may, for example, also be partially attached to the aforementioned transducer protective housing. In the case of transducers of conventional (standard) measuring systems, the at least one vibration exciter is typically moreover designed and arranged such that the drive force generated thereby acts practically only at points on the respective tube or that a line of action of the drive force generated thereby is substantially perpendicular to a normal of a drive cross-sectional area, viz., a cross-sectional area of the tube, which is enclosed by an imaginary circumferential line passing through the aforementioned drive point. In the case of (standard) transducers of marketed (standard) measuring systems, the exciter assemblies, such as, inter alia, also shown in U.S. Pat. Nos. 5,602,345, 5,796,010, 6,840,109, 7,077,014 or 7,017,424, 2014/0352454, WO-A 93/01472, WO-A 2005/050145, WO-A 2013/002759, WO-A 2011/019345, are typically moreover designed such that each of the tubes is (partially) connected to exactly one vibration exciter in such a way that, apart from the (one) vibration exciter, the exciter assembly does not have any further vibration exciter connected to the respective tube. Not least for this (standard) case, the vibration exciter is typically of the electrodynamic type, viz., formed by means of an vibration coil, e.g., in such a way that the magnetic armature thereof is mechanically connected to the at least one tube to form the drive point, and that the air coil thereof which is flooded by the magnetic field of the armature is electrically connected to the measuring system electronics unit and is mechanically connected to the other tube or the counter-oscillator of the tube assembly or to the transducer protective housing. Nevertheless, vibronic measuring systems are also known, for example, from WO-A 2017/069749, WO-A 2017/019016, WO-A 2006/036139, U.S. Pat. No. 5,926,096, WO-A 99/28708, WO-A 99/44018, WO-A 99/02945, 2020/0132529, U.S. Pat. Nos. 4,831,885, 6,557,422, 6,092,429, or also 4,823,614, in which the exciter assembly has two or more vibration exciters respectively connected to one and the same one of the tubes of the respective tube assembly and/or formed by means of one or more piezo elements.

In order to detect vibrations of the at least one tube, the sensor assembly has at least two, e.g., electrodynamic or optical, vibration sensors, of which a first vibration sensor is positioned on the inlet side on the tube at a distance from the vibration exciter in the flow direction, and a second vibration sensor, typically structurally identical to the first vibration sensor, is positioned on the outlet side on the tube at a distance from the vibration exciter in the flow direction. Each of the at least two vibration sensors is moreover configured to detect vibration movements of the tube and convert them into a first or second vibration signal, which is especially electrical or optical and represents said vibration movements, the vibration signal having, for example, an electrical voltage dependent upon the vibrations of the tube. In the case of electrodynamic vibration sensors, they can respectively be formed, for example, by means of a plunger coil electrically connected to the measuring system electronics unit, for example, viz., in such a way that the magnetic armature thereof is mechanically connected to the at least one tube and that the air coil thereof which is flooded by the magnetic field of the armature is electrically connected to the measuring system electronics unit and is mechanically connected to the other tube or the counter-oscillator of the tube assembly or to the transducer protective housing.

The measuring system electronics unit of each of the aforementioned measuring systems is moreover configured to energize during operation the at least one vibration exciter according to the useful mode to be excited, viz., to feed electrical power into the at least one vibration exciter by means of at least one electrical drive signal having a temporally-variable electrical current controlled, e.g., with regard to (AC) frequency, phase angle, and amplitude, in such a way that the tube performs forced mechanical vibrations, viz., for example, flexural vibrations, with one or more vibration frequencies that are specified by the drive signal and typically, viz., correspond to one or more resonance frequencies of the at least one tube; this, for example, also with a constantly controlled vibration amplitude. Especially, the measuring system electronics unit is configured to at least intermittently provide the aforementioned drive signal for the vibration exciter with a sinusoidal (useful) current having an (AC) frequency, in such a way that the at least one tube at least partially or predominantly performs useful vibrations, viz., mechanical vibrations forced by the (energized) vibration exciter, with a useful frequency, viz., a (vibration) frequency corresponding to the aforementioned (AC) frequency. For this purpose, the drive signal may be formed as a harmonic sinusoidal signal, viz., a sinusoidal signal having exactly the one (AC) frequency and therefore not containing any further spectral current components apart from the (useful) current, or, for example, also as a multi-frequency signal, viz., a signal containing several signal components with different (AC) frequencies. As a result of the aforementioned excitation of useful vibration of the at least one tube, each of the first and second vibration signals provided by the sensor assembly respectively also contains one or more sinusoidal signal components with respectively one frequency corresponding to a vibration frequency of vibration movements of the tube, specifically in such a way that each of the first and second vibration signals respectively has at least also one useful signal component, viz., a sinusoidal signal component with a (signal) frequency corresponding to the useful frequency.

In the case of measuring systems of the type in question, typically one or more of a plurality of natural vibration modes, inherent in the tube and respectively having an associated resonance frequency, especially, viz., one or more symmetric vibration modes in which the tube can perform or performs vibration movements respectively having an odd number of vibration antinodes and a correspondingly even number of vibration nodes, is used as the useful mode. Not least due to their particular suitability for measuring both the mass flow and the density and also the viscosity of the flowing measured substance, in such measuring systems, especially also in the case of marketable standard measuring systems, one or more natural symmetric flexural vibration modes are preferably used as the useful mode, viz., especially, in such a way that the useful vibrations in the measured substance flowing through the at least one tube with a non-zero mass flow cause Coriolis forces. In the case of transducers with a curved tube or curved tubes, such a symmetric flexural vibration mode and therefore such an odd-order flexural vibration mode, in which the respective tube oscillates about an imaginary first vibration axis, which imaginarily connects the first and second tube ends, in the manner of a cantilever, which is only clamped at one end, about a static resting position (out-of-plane mode), is typically selected as the useful mode, while, in the case of transducers with a straight tube or straight tubes, such a symmetric flexural vibration mode, in which the respective tube oscillates about an imaginary vibration axis, which coincides with one of the main inertia axes thereof (longitudinal axis) and imaginarily connects the first and second tube ends, in the manner of a clamped string about a static resting position (in-plane mode), is usually selected as the useful mode. In marketable measuring systems, especially the use of the first-order (flexural) vibration mode, occasionally also referred to as the fundamental vibration mode or f1 mode, in which the vibration movements of the tube respectively have exactly one vibration antinode and two vibration nodes and are therefore symmetric, and more rarely also the use of the higher odd-order (flexural) vibration mode, e.g., the third-order (flexural) vibration mode (f3 mode), in which the vibration movements of the tube thus respectively have exactly three vibration antinodes and four vibration nodes, has become established as the useful mode.

A (resonance) frequency distance, viz., a difference between the resonance frequencies of the f1 mode and the adjacent second-order (flexural) vibration mode (f2 mode) or between the f2 mode and the f3 mode, is typically in each case in an order of magnitude between a few 100 Hz and a few 1000 Hz in marketable measuring systems.

Not least for the purpose of efficient excitation of the useful mode, the measuring system electronics unit is especially also configured to accordingly adjust the (AC) frequency determining the useful frequency, such that the useful frequency ultimately as precisely as possible corresponds to a resonance frequency of one of the (symmetric) odd-order vibration modes, viz., especially the resonance frequency (f1) of the first-order vibration mode (f1 mode) or a resonance frequency (f3) of the third-order vibration mode (f3 mode) or deviates from the respective resonance frequency to be adjusted by less than 1% of said resonance frequency and/or by less than 1 Hz and therefore from the resonance frequency of any other of the natural vibration modes of the tube by more than 5% of said resonance frequency and/or more than 10 Hz, or the measuring system electronics unit is accordingly also configured to follow a change in said resonance frequency, e.g., as a result of a change in the density of the measured substance conducted in the tube, with a change in the (AC) frequency of the drive signal such that the excited useful vibrations are predominantly resonance vibrations of the at least one tube. In order to adjust the (AC) frequency, the measuring system electronics unit of the respective measuring system, e.g., as respectively shown in US-A 2016/0349091, 2017/0030870, U.S. Pat. Nos. 5,831,178, and 4,801,897, may, for example, have a phase locked loop (PLL), and optionally also a digital one.

As a result of the useful vibrations of the at least one tube excited in the aforementioned manner, Coriolis forces, which, inter alia, also depend upon the mass flow, are induced in the measured substance flowing through, in such a way that the useful vibrations are superposed by Coriolis vibrations, viz., additionally forced vibrations with a useful frequency, which correspond to a natural vibration mode, sometimes also referred to as a Coriolis mode, with an order respectively increased by one in comparison to the order of the useful mode; this especially in such a way that the useful signal components of the vibration signals also depend on the mass flow of the measured substance, viz., respectively have a (measurement) phase angle dependent on the mass flow of the measured substance conducted in the at least one tube or follow a change in said mass flow with a change in a (measurement) phase difference of the useful signal components, viz., a difference (normalized to the useful frequency) between the (measurement) phase angle of the useful signal component of the first vibration signal and the (measurement) phase angle of the useful signal component of the second vibration signal. In the case of marketable (standard) measuring systems, the second-order antisymmetric vibration mode is typically used as the Coriolis mode when the fundamental vibration mode is used as the useful mode, or the fourth-order antisymmetric vibration mode is typically used as the Coriolis mode when the third-order vibration mode is used as the useful node.

The measuring system electronics unit of each of the aforementioned measuring systems is also correspondingly configured to determine, on the basis of one or more of the aforementioned vibration signals, one or more measured values representing the respective flow parameters of the measured substance to be measured, viz., in the case of a measuring system designed as a Coriolis mass flow measuring device or as a Coriolis mass flow/density measuring device, to generate (mass-flow) measured values representing the mass flow, for example, on the basis of the aforementioned (measurement) phase difference of the useful signal components caused by the vibrations of the tube in the Coriolis mode and on the basis of a phase-difference-to-measured-value characteristic function configured in the measuring system electronics unit. The phase-difference-to-mass-flow-measured-value characteristic curve function may, for example, be a (linear) parameter function with a (scale) zero point, which corresponds to a (measurement) phase difference of the useful signal components measurable when the measured substance rests or a mass flow is zero, and with a slope, which corresponds to a (measurement) sensitivity or a change of the (measurement) phase difference of the useful signal components related to a change in the mass flow. As already mentioned, since the resonance frequency of the vibration mode used as the useful mode especially depends on the instantaneous density of the measured substance, in addition to the mass flow, the density of the measured substance respectively flowing through is additionally also directly measured by means of such a measuring system on the basis of the (AC) frequency of the drive signal and/or on the basis of the (signal) frequency of the useful signal components of the vibration signals. Accordingly, the measuring system electronics unit of measuring systems of the type in question is typically furthermore also configured to generate (density) measured values representing the density, on the basis of the aforementioned (AC) frequency of the drive signal and/or on the basis of the signal frequency of the aforementioned useful signal component of at least one of the vibration signals, for example by using a useful-frequency-to-measured-value characteristic curve function correspondingly configured in the measuring system electronics unit. In addition, it is also possible, by means of vibronic measuring systems of the type in question, to directly measure the viscosity of the measured substance flowing through, e.g., based on an excitation energy or excitation power required for maintaining the useful vibrations and/or based on a damping, resulting from a dissipation of vibration energy, of the useful vibrations, or by using a damping-to-measured-value characteristic curve function correspondingly configured in the measuring system electronics unit. In addition, further measured variables derived from the aforementioned flow and/or substance parameters, such as the Reynolds number, can be easily determined by means of such vibronic measuring systems.

For the aforementioned (standard) case in which one or more natural symmetric (flexural) vibration modes or odd-order (flexural) vibration modes are (to be) used as the useful mode in the respective measuring system and in which exactly a single vibration exciter is provided per tube (or per tube pair), the vibration exciter is typically positioned and aligned such that the aforementioned drive cross-sectional area is (nominally) located in the region of half the tube length and therefore at a respective maximum vibration amplitude of each of the aforementioned symmetric vibration modes or a maximum amplitude of the corresponding useful vibrations, nevertheless at a vibration node of asymmetric (even-order) (flexural) vibration modes likewise inherent in the tube. Due to various manufacturing tolerances in the transducer production, e.g., during the positioning of the vibration exciter and/or of the vibration sensors on the at least one tube and/or also during the manufacture of the at least one tube itself, it is however regularly assumed that a transducer provided in this way has in each case a drive offset, which is measured as a smallest distance between the drive cross-sectional area of the tube and a specified reference cross-sectional area of the at least one tube, viz., a reference cross-sectional area located at a maximum amplitude of the vibration movements of the useful vibrations, and which is slightly different from zero. In the case of perfectly symmetric tube, the reference cross-sectional area also corresponds to a symmetry plane of the tube, or an intersection line between said symmetry plane and another symmetry plane, orthogonal thereto, of the at least one tube or a main inertia axis, perpendicular to the vibration direction of the vibration movements of the tube in the useful mode, of the at least one tube is within the aforementioned reference cross-sectional area. In the case of marketable (standard) measuring systems, the drive offset may absolutely be in the order of magnitude of up to 5 mm or 0.5% of the tube length but is typically usually less than 2 mm or less than 0.2% of the tube length.

Not least the aforementioned drive offset also results, inter alia, in such interference vibrations of the tube of equal frequency, which correspond to the second-order vibration mode (f2 mode) and therefore to the aforementioned Coriolis mode, are also forced, in addition to the useful vibrations, even when the tube is not flowed through by fluid or in the case of a mass flow of zero in the tube. As a result thereof, the useful signal components of the vibration signals may, inter alia, also respectively have additional (interference) phase angles such that, in addition to the respective (measurement) phase difference, there exists, between the useful signal components of the vibration signals, an (interference) phase difference of equal frequency that is independent of the mass flow, and the vibration signals therefore have a non-vanishing systematic phase error or also zero-point error that corresponds to the phase difference (normalized to the useful frequency) between the useful signal components of the two vibration signals in the case of a mass flow of zero; this in particular also such that the phase error also depends on one or more substance parameters of the measured substance, especially also the viscosity thereof. A compensation for the aforementioned phase error typically takes place in the course of a (wet) calibration of the respective measuring system, for example with the aid of one or more specified (reference) mass flows, which are in each case, for example, constant or occasionally also zero, of one or more calibration fluids which are kept as stably as possible on a (reference) temperature and/or a (reference) pressure, such as water or air, possibly also oil at 20° C. (room temperature) and 1 bar (atmospheric pressure), and are (sequentially) respectively conducted through the transducer while the at least one tube is excited in each case in the aforementioned manner to vibrate in useful vibrations. On the basis of the vibration signals, a respective reference phase difference, viz., a difference between a (reference) phase angle of the useful signal component of each of the two vibration signals, in the respective (digital) reference phase difference value respectively representing the reference mass flow can thus be determined and, by using the reference phase difference values, a (damping) correction value correspondingly compensating the (interference) phase difference can thereafter be calculated, for example by means of a compensation calculation; this, for example, in such a way that the (damping) correction value corresponds to the aforementioned (scale) zero point of the phase-difference-to-measured-value characteristic curve function, and/or that the measuring system electronics unit ultimately determines, by means of the phase-difference-to-measured-value characteristic curve function, on the basis of the respective reference phase difference or the respective reference phase difference value, mass-flow measured values which represent the respective reference mass flow at least for one of the calibration fluids, for example water at 20° C. and 1 bar, and which each have a measurement deviation of less than 0.1% of said reference mass flow and/or less than 0.05 kg/h. Consideration of the dependencies of the (interference) phase difference beyond this, for example on the aforementioned substance parameters of the respective calibration fluid, not least also its viscosity, require further measurements under correspondingly varied reference conditions. Thus, for example, in the measuring systems shown in U.S. Pat. No. 6,513,393, US-A 2020/0393278, US-A 20190003875 or WO-A 2020/259762, the dependence of the (interference) phase difference on the viscosity of the measured substance is compensated on the basis of previously determined viscosity values, for example also use of a data field for (damping) correction values which shows the dependence of the flow parameter on the viscosity and was determined by complex individual measurements and interpolation methods.

There is therefore a need, on the one hand, to further improve the measurement accuracy of vibronic measuring systems of the type in question or to improve the robustness or stability with which the measured values for the at least one flow parameter can be determined during operation of such a measuring system, even in the case of fluctuating properties or substance parameters of the respective measured substance, viz., especially the viscosity thereof, and on the other hand to reduce the technical complexity for detecting and taking into account further dependencies of the (interference) phase difference in the determination of the measured values, not least also in the determination of (mass-flow) measured values by means of the aforementioned phase-difference-to-measured-value characteristic curve function.

SUMMARY

Taking this into account, it is therefore an object of the present invention to further improve vibronic measuring systems of the type in question by a corresponding consideration of the drive offset or its temporal changes with regard to the achievable (measurement) accuracy and robustness with which the measured values are determined during operation; this not least also in the case of a first-time or repeated calibration of such a vibronic measuring system in situ, viz., directly on site at the respective measuring point, and/or in the case of a vibronic measuring system with a locally replaceable tube assembly and/or in the case of a use of a (standard) transducer established for conventional vibronic measuring systems and/or of an equally extensive retention of proven technologies and architectures for the respective measuring system electronics unit. Moreover, a further object of the invention is to provide a vibronic measuring system which makes it possible to take into account the aforementioned drive offset during operation or during calibration and in which, associated therewith, an (interference) phase angle caused by the drive offset, or a corresponding cross-sensitivity of the measured values determined by the measuring system to changing substance parameters of the measured substance is reduced.

In order to achieve this object, the invention consists in a vibronic measuring system, for example a Coriolis mass flow measuring device or Coriolis mass flow/density measuring device,
which measuring system, designed, for example, as an in-line measuring device and/or a measuring device in compact design, is configured to measure at least one flow parameter, viz., for example, a mass flow and/or a volume flow and/or a flow rate, of a fluid measured substance, e.g., of a gas, a liquid, or a dispersion, flowing, for example, in a tube line and/or a hose line; and which measuring system comprises:

a (vibration-type) transducer with a tube assembly for conducting the flowing measured substance, with an exciter assembly for converting electrical power into mechanical power used to excite and maintain forced mechanical vibrations of the tube assembly and with a sensor assembly for detecting mechanical vibrations of the tube assembly and for providing vibration signals respectively representing vibration movements of the tube assembly;

and a measuring system electronics unit which is electrically connected to the transducer, viz., for example, both to its exciter assembly and to its sensor assembly and/or by means of electrical connecting lines, is formed, for example, by means of at least one microprocessor and/or is arranged in an electronics protective housing, wherein the measuring system electronics unit is configured to at least intermittently feed an electrical drive signal into the vibration exciter;

wherein the tube assembly has at least one tube (111), which is, for example, at least sectionally curved and/or at least sectionally straight, and/or a first tube, which tube extends from a first tube end to a second tube end with a tube length of, for example, more than 100 mm, and has a lumen, which is enclosed by a tube wall, e.g., a metallic tube wall, and extends from the first tube end to the second tube end, and which tube is configured to be flowed through by the measured substance at least in a flow direction from the first tube end to the second tube end and, meanwhile, to be allowed to vibrate, and wherein inherent in the tube assembly is a plurality of vibration modes (natural vibration forms) respectively having an associated (modal) damping and an associated resonance frequency (co-)determined thereby, in which modes the at least one tube can perform or performs (damped) vibration movements respectively having one or more vibration antinodes and two or more vibration nodes, in such a way that vibration movements of the tube in a fundamental vibration mode, viz., a first-order vibration mode (f1 mode), viz., for example, a first-order flexural vibration mode, have exactly one vibration antinode and two vibration nodes and that vibration movements of the tube in a harmonic mode, viz., a second-order or higher-order vibration mode (f2 mode, f3 mode, . . . fx mode), viz., for example, a second-order or higher-order flexural vibration mode, have two or more vibration antinodes and three or more vibration nodes;

wherein the exciter assembly has at least one, for example single and/or electrodynamic, vibration exciter, which is mechanically connected to the at least one tube and is configured to convert electrical power with a temporally variable electrical current into mechanical power in such a way that, at a drive point formed by means of the vibration exciter on the tube mechanically connected thereto, a temporally variable drive force acts on the tube, for example in such a way that a line of action of the drive force is perpendicular to a normal of a drive cross-sectional area of the tube, wherein the vibration exciter is positioned and aligned such that a drive offset, viz., a smallest distance between a drive cross-sectional area of the tube enclosed by an imaginary circumferential line of the tube passing through the drive point, and a specified reference cross-sectional area of the at least one tube, for example determined with an intact or original transducer, is not more than 3 mm, e.g., less than 2 mm, and/or less than 0.5% of the tube length, viz., for example, less than 0.2% of the tube length, wherein a vibration node formed between two vibration antinodes of vibration movements of the at least one tube in a (second-order or higher-order) vibration mode (deviating from the first-order vibration mode) and, for example, (nominally) located at half the tube length, of said vibration movements is within the reference cross-sectional area;

wherein the sensor assembly has a first vibration sensor, e.g., an electrodynamic or opto-electrical first vibration sensor, which is positioned on the tube at a distance from the vibration exciter, for example in the flow direction, of more than 10 mm and/or more than one fifth of the tube length, viz., for example, at least partially mechanically connected to the tube and which is configured to detect vibration movements of the at least one tube and convert them into a first vibration signal representing said vibration movements, e.g., an electrical or optical first vibration signal, for example in such a way that the first vibration signal contains one or more sinusoidal signal components respectively having a frequency corresponding to a vibration frequency of vibration movements of the tube;

and wherein the sensor assembly has at least one second vibration sensor, e.g., an electrodynamic or opto-electrical second vibration sensor, which is positioned on the tube at a distance from the vibration exciter, for example in the flow direction, of more than 10 mm and/or more than one fifth of the tube length and/or at a distance from the first vibration sensor in the flow direction, viz., for example, at least partially mechanically connected to the tube and which is configured to detect vibration movements of the at least one tube and convert them into a second vibration signal representing said vibration movements, e.g., an electrical or optical second vibration signal, for example in such a way that the second vibration signal contains one or more sinusoidal signal components respectively having a frequency corresponding to a vibration frequency of vibration movements of the tube;

wherein the measuring system electronics unit is configured to feed the electrical drive signal into the vibration exciter both, at least intermittently, with a sinusoidal first (useful) current component having a first (AC) frequency and a first (current) amplitude, e.g., a specified and/or variable amplitude, to excite first useful vibrations, viz., mechanical vibrations of the at least one tube forced by the (energized) vibration exciter and having a first useful frequency, viz., a (vibration) frequency corresponding to the first (AC) frequency, in such a way that the first (AC) frequency deviates from a resonance frequency of an odd-order (symmetric) vibration mode, viz., for example, the fundamental vibration mode (f1 mode), by less than 1% of said resonance frequency and/or by less than 1 Hz, viz., for example, corresponds to the resonance frequency of the odd-order vibration mode, and/or in such a way that the second useful vibrations are suitable for causing Coriolis forces in a measured substance flowing through the at least one tube with a non-zero mass flow, wherein the resonance frequency corresponds to or depends on an associated first modal damping of said odd-order vibration mode, and that the first or second vibration signals generated by means of the first and second vibration sensors each have a first useful signal component, viz., a sinusoidal signal component having a (signal) frequency corresponding to the first useful frequency, viz., for example, also in each case with a phase angle dependent on the mass flow of the measured substance flowing through the at least one tube, and, at least intermittently, with a sinusoidal second (useful) current component having a second (AC) frequency and a second (current) amplitude, e.g., a specified and/or variable amplitude, to generate second useful vibrations, viz., mechanical vibrations of the tube forced by the (energized) vibration exciter and having a second useful frequency, viz., a (vibration) frequency corresponding to the second (AC) frequency, for example simultaneously with the first (useful) current component, in such a way that the second (AC) frequency deviates from a resonance frequency of an even-order (antisymmetric) vibration mode, viz., for example, the second-order vibration mode (f2 mode), by less than 1%, e.g., by less than 0.1%, of said resonance frequency and/or by less than 1 Hz, e.g., by less than 0.1 Hz, viz., for example, corresponds to the resonance frequency of the even-order vibration mode, wherein the resonance frequency corresponds to or depends on an associated second modal damping of said even-order vibration mode, and that the first or second vibration signals generated by means of the first and second vibration sensors each have a second useful signal component, viz., a sinusoidal signal component having a (signal) frequency corresponding to the second useful frequency, and wherein the measuring system electronics unit is configured to determine, both on the basis of the first useful signal components, e.g., on the basis of a difference between a phase angle of the first useful signal component of the first vibration signal and a phase angle of the first useful signal component of the second vibration signal, and on the basis of at least one of the second useful signal components and/or of the second (useful) current component, measured values representing the at least one flow parameter of the measured substance, viz., for example, mass-flow measured values representing the mass flow of the measured substance.

According to a first embodiment of the invention, it is furthermore provided that the first useful frequency deviates from a resonance frequency of the fundamental vibration mode by less than 1% of said resonance frequency and/or by less than 1 Hz, viz., especially, corresponds to the resonance frequency of the first-order vibration mode.

According to a second embodiment of the invention, it is furthermore provided that the first useful frequency deviates from a resonance frequency of a third-order vibration mode inherent in the at least one tube, viz., especially, a third-order flexural vibration mode, in which vibration mode the vibration movements of the tube have exactly three vibration antinodes and two vibration nodes, by less than 1% of said resonance frequency and/or by less than 1 Hz, viz., especially, corresponds to the resonance frequency of the third-order vibration mode; this, for example, in such a way that a first vibration node of vibration movements of the at least one tube in the third-order vibration mode is located in the first tube end and a second vibration node of the third-order vibration mode is located in the second tube end.

According to a third embodiment of the invention, it is furthermore provided that the second useful frequency deviates from a resonance frequency of a second-order vibration mode (f2 mode) inherent in the at least one tube, viz., especially, a second-order flexural vibration mode, in which vibration mode the vibration movements of the tube have exactly two vibration antinodes and three vibration nodes, by less than 1% of said resonance frequency and/or by less than 1 Hz, viz., especially, corresponds to the resonance frequency.

According to a fourth embodiment of the invention, it is furthermore provided that the second useful frequency deviates from a resonance frequency of a second-order vibration mode (f2 mode) inherent in the at least one tube, viz., especially, a second-order flexural vibration mode, in which vibration mode the vibration movements of the tube have exactly two vibration antinodes and three vibration nodes, by less than 1% of said resonance frequency and/or by less than 1 Hz, viz., especially, corresponds to the resonance frequency, and that a first vibration node of vibration movements of the at least one tube in the second-order vibration mode is located in the first tube end and a second vibration node of vibration movements of the at least one tube in the second-order vibration mode is located in the second tube end.

According to a fifth embodiment of the invention, it is furthermore provided that the second useful frequency deviates from a resonance frequency of a second-order vibration mode (f2 mode) inherent in the at least one tube, viz., especially, a second-order flexural vibration mode, in which vibration mode the vibration movements of the tube have exactly two vibration antinodes and three vibration nodes, by less than 1% of said resonance frequency and/or by less than 1 Hz, viz., especially, corresponds to the resonance frequency, and that a vibration node of said vibration movements, formed between the two vibration antinodes of the vibration movements of the at least one tube in the second-order vibration mode and, especially, is located at half the tube length is within the reference cross-sectional area.

According to a sixth embodiment of the invention, it is furthermore provided that the second useful frequency deviates from a resonance frequency of a second-order vibration mode (f2 mode) inherent in the at least one tube, viz., especially, a second-order flexural vibration mode, in which vibration mode the vibration movements of the tube have exactly two vibration antinodes and three vibration nodes, by less than 1% of said resonance frequency and/or by less than 1 Hz, viz., especially, corresponds to the resonance frequency, and that a main inertia axis of the at least one tube, which is perpendicular to the vibration direction of the vibration movements of the tube in the second-order vibration mode, is within the reference cross-sectional area of the at least one tube.

According to a seventh embodiment of the invention, it is furthermore provided that the drive offset corresponds to a distance between an area centroid (center point) of the drive cross-sectional area of the tube and an area centroid (center point) of the reference cross-sectional area of the at least one tube.

According to an eighth embodiment of the invention, it is furthermore provided that a line of action of the drive force is perpendicular to a normal of a drive cross-sectional area of the tube.

According to a ninth embodiment of the invention, it is furthermore provided that an intersection line of two, mutually orthogonal symmetry planes of the at least one tube is within the reference cross-sectional area.

According to a tenth embodiment of the invention, it is furthermore provided that a main inertia axis, perpendicular to the drive force, of the at least one tube is within the reference cross-sectional area of the at least one tube.

According to an eleventh embodiment of the invention, it is furthermore provided that the drive offset results from a manufacturing tolerance during the production of the exciter assembly, viz., especially, from tolerances in the positioning of the vibration exciter on the at least one tube and/or from tolerances in the positioning of the tube assembly within a transducer protective housing.

According to a twelfth embodiment of the invention, it is furthermore provided that the drive offset results from a manufacturing tolerance during the production of the tube assembly, viz., especially, the manufacture of the at least one tube.

According to an thirteenth embodiment of the invention, it is furthermore provided that the measuring system electronics unit is configured to provide the second useful current of the drive signal at least intermittently simultaneously with the first (useful) current component, e.g., in such a way that an amplitude of the first (useful) current component is adjusted to not be less than an amplitude of the second (useful) current component and/or that an amplitude of the second (useful) current component is adjusted to more than 40%, e.g., in particular not less than 50%, of an amplitude of the first (useful) current component.

According to a fourteenth embodiment of the invention, it is furthermore provided that the measuring system electronics unit is configured to adjust the second (AC) frequency as a function of the first (AC) frequency, especially, in such a way that the second (AC) frequency is within a frequency setting interval, of which an upper interval limit and/or a lower interval limit and/or a center frequency corresponds to a specified multiple of the first (AC) frequency, viz., especially, a multiple of the first (AC) frequency corresponding to more than 230% of the first (AC) frequency and/or less than 300% of the first (AC) frequency.

According to a fifteenth embodiment of the invention, it is furthermore provided that the measuring system electronics unit is configured to simultaneously feed the first and second (useful) currents of the drive signal, especially for a time interval that is not less than two vibration periods of the first (useful) current component and/or more than 10 ms, into the vibration exciter.

According to a sixteenth embodiment of the invention, it is furthermore provided that the measuring system electronics unit is configured to switch on the second (useful) current component during the feeding of the first (useful) current component, viz., especially, to switch the second (useful) current component off again after a time interval that is not less than two vibration periods of the first (useful) current component and/or more than 1 s.

According to a seventeenth embodiment of the invention, it is furthermore provided that the measuring system electronics unit has a first phase-locked loop, especially, a digital first phase-locked loop, used to adjust the first (AC) frequency, and a second phase-locked loop, especially, a digital second phase-locked loop, used to adjust the second (AC) frequency. Moreover, the measuring system electronics unit may furthermore be configured to adjust a capture range of the second phase-locked loop by means of at least one output signal of the first phase-locked loop, especially, an output signal of a loop filter of the first phase-locked loop, and/or on the basis of the first (AC) frequency.

According to an eighteenth embodiment of the invention, it is furthermore provided that the measuring system furthermore comprises a support frame, especially a metallic support frame and/or one designed as a transducer protective housing, wherein the support frame and the tube assembly are fastened to one another, especially in a detachable manner, and wherein the exciter assembly, viz., especially, the at least one vibration exciter, and/or the sensor assembly, viz., especially, the first and second vibration sensors, are partially attached to the support frame.

According to a nineteenth embodiment of the invention, it is furthermore provided that the measuring system furthermore comprises an electronics protective housing for the measuring system electronics unit, which protective housing is, especially, fastened to a support frame or a transducer protective housing of the transducer and/or is metallic.

According to a twentieth embodiment of the invention, it is furthermore provided that, apart from the vibration exciter, the transducer does not have any further vibration exciter mechanically connected to the at least one tube.

According to a twenty-first embodiment of the invention, it is furthermore provided that the measuring system electronics unit is configured to determine, based on the first useful signal component of at least one of the first and second vibration signals and/or the first (useful) current component of the drive signal, at least one, especially, digital, first quality value, wherein the first quality value represents a measure of the first modal damping, viz., especially, a quality of the first useful vibrations or a damping ratio of the first useful vibrations, or depends on said first modal damping, and that the measuring system electronics unit is configured to determine, based on the second useful signal component of at least one of the first and second vibration signals and/or the second (useful) current component of the drive signal, at least one, especially, digital, second quality value, wherein the second quality value represents a measure of the second modal damping, viz., especially, a quality of the second useful vibrations or a damping ratio of the second useful vibrations, or depends on said second modal damping.

According to a twenty-second embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and that the measuring system electronics unit is configured to determine, based on the first and second vibration signals and/or the drive signal, especially on the basis of at least one first useful signal component and at least one second useful signal component and/or on the basis of the first and second (useful) current components, at least one, especially, digital, (damping) correction value for the measurement phase difference and/or measured values provisionally determined on the basis of said measurement phase difference.

According to a twenty-third embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and that the measuring system electronics unit is configured to determine, based on the first and second vibration signals and/or the drive signal, especially on the basis of at least one first useful signal component and at least one second useful signal component and/or on the basis of the first and second (useful) current components, at least one, especially, digital, (damping) correction value for the measurement phase difference or measured values provisionally determined on the basis of said measurement phase difference, in such a way that the (damping) correction value corresponds to the first and second modal dampings or is a function of said first and second modal dampings, and/or that the (damping) correction value is subtracted from the measurement phase difference or from measured values provisionally determined on the basis of the measurement phase difference, and/or that the (damping) correction value corresponds to the drive offset, viz., especially, depends thereon and/or is a measure of the drive offset.

According to a twenty-fourth embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and that the measuring system electronics unit is configured to determine, based on the first and second vibration signals and/or the drive signal, especially on the basis of at least one first useful signal component and at least one second useful signal component and/or on the basis of the first and second (useful) current components, at least one, especially, digital, (damping) correction value for the measurement phase difference and/or measured values provisionally determined on the basis of said measurement phase difference, in such a way that the (damping) correction value corresponds to the first and second modal dampings or is a function of the first and second modal dampings, especially, in such a way that the (damping) correction value corresponds to a function of a quality $(1/D2)$ of the second useful vibrations or a reciprocal of a damping ratio of the second useful vibrations and a second power of a damping ratio of the first useful vibrations or a reciprocal of a quality $(1/D1)$ of the first useful vibrations.

According to a twenty-fifth embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and that the measuring system electronics unit is configured to determine, based on the first and second vibration signals and/or the drive signal, especially on the basis of at least one first useful signal component and at least one second useful signal component and/or on the basis of the first and second (useful) current components, at least one, especially, digital, (damping) correction value for the measurement phase difference or measured values provisionally determined on the basis of said measurement phase difference, in such a way that the (damping) correction value corresponds to a function of a product of a quality $(1/D1)$ of the first useful vibrations or a second power of a quality $(1/D2)$ of the second useful vibrations or a product of a reciprocal of a damping ratio of the first useful vibrations and a second power of a reciprocal of a damping ratio of the second useful vibrations.

According to a twenty-sixth embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and that the measuring system electronics unit is configured to determine, based on the first and second vibration signals and/or the drive signal, especially on the basis of at least one first useful signal component and at least one second useful signal component and/or on the basis of the first and second (useful) current components, at least one, especially, digital, (damping) correction value for the measurement phase difference or measured values provisionally determined on the basis of said measurement phase difference, in such a way that a magnitude of the (damping) correction value decreases with increasing first modal damping (D1) and/or increases with increasing second modal damping (D2).

According to a twenty-seventh embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and that the measuring system electronics unit is configured to determine, based on the first and second vibration signals and/or the drive signal, especially on the basis of at least one first useful signal component and at least one second useful signal component and/or on the basis of the first and second (useful) current components, at least one, especially, digital, (damping) correction value for the measurement phase difference or measured values provisionally determined on the basis of said measurement phase difference, in such a way that the (damping) correction value is proportional to a ratio $(D1^2/D2)$ of a second power $(D1^2)$ of the first modal damping (D1) to the second modal damping (D2).

According to a twenty-eighth embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and that the measuring system electronics unit is configured to determine, based on the first and second vibration signals and/or the drive signal, especially on the basis of at least one first useful signal component and at least one second useful signal component and/or on the basis of the first and second (useful) current components, at least one, especially, digital, (damping) correction value for the measurement phase difference or measured values provisionally determined on the basis of said measurement phase difference, in such a way that the measuring system electronics unit is configured to store the (damping) correction value, especially, in a non-volatile data memory, and/or in such a way that the (damping) correction value is stored as a reference value specific to the measuring system, and/or is contained in a measurement function of the measuring system, according to which the measuring system converts the at least one flow parameter to be measured into the respective measured values.

According to a twenty-ninth embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and that the measuring system electronics unit is configured to determine, based on the first and second vibration signals and/or the drive signal, especially on the basis of at least one first useful signal component and at least one second useful signal component and/or on the basis of the first and second (useful) current components, at least one, especially, digital, (damping) correction value for the measurement phase difference or measured values provisionally determined on the basis of said measurement phase difference, in such a way that the measuring system electronics unit is configured to compare the (damping) correction value to an initial (damping) correction value, which is determined in advance, especially, under reference conditions, and/or during a start-up of the measuring system and/or during a (re)calibration of the measuring system and/or with a structurally identical other measuring system, was, especially, stored in the measuring system electronics unit and/or is used as a reference value.

According to a thirtieth embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and that the measuring system electronics unit is configured to determine, based on the first and second vibration signals and/or the drive signal, especially on the basis of at least one first useful signal component and at least one second useful signal component and/or on the basis of the first and second (useful) current components, at least one, especially, digital, (damping) correction value for the measurement phase difference or measured values provisionally determined on the basis of said measurement phase difference, in such a way that the measuring system electronics unit is configured to compare the (damping) correction value to at least one threshold value specified therefor and especially representing an out-of-spec transducer and/or an impermissibly large drive offset, and/or that the measuring system electronics unit is configured to determine, by means of the at least one of the first and second vibration signals and/or the drive signal, especially by using the (damping) correction value, an extent of the drive offset, and/or to perform a check of the measuring system.

According to a thirty-first embodiment of the invention, it is furthermore provided that the measuring system electronics unit is configured to determine measured values at least provisionally representing the at least one flow parameter of the measured substance, viz., especially, mass-flow measured values at least provisionally representing the mass flow of the measured substance, on the basis of a measurement phase difference, viz., a difference between a phase angle of the first useful signal component of the first vibration signal and a phase angle of the first useful signal component of the second vibration signal, and it is furthermore provided that the measuring system electronics unit is configured to determine, based on the first useful signal component of at least one of the first and second vibration signals and/or the first (useful) current component of the drive signal, at least one, especially, digital, first quality value, wherein the first quality value represents a measure of the first modal damping, viz., especially, a quality of the first useful vibrations or a damping ratio of the first useful vibrations, or depends on said first modal damping, and that the measuring system electronics unit is configured to determine, based on the second useful signal component of at least one of the first and second vibration signals and/or the second (useful) current component of the drive signal, at least one, especially, digital, second quality value, wherein the second quality value represents a measure of the second modal damping, viz., especially, a quality of the second useful vibrations or a damping ratio of the second useful vibrations, or depends on said second modal damping, wherein the measuring system electronics unit is configured to determine, by means of the first and second quality values, at least one, especially, digital, (damping) correction value for the measurement phase difference or measured values provisionally determined on the basis of said measurement phase difference, for example in such a way that the (damping) correction value corresponds to a function of a quality $(1/D2)$ of the second useful vibrations or of a reciprocal of a damping ratio of the second useful vibrations and a second power of a damping ratio of the first useful vibrations or a reciprocal of a quality (1/D1) of the first useful vibrations.

According to a thirty-second embodiment of the invention, it is furthermore provided that the first useful signal components of the first and second vibration signals follow a change in a mass flow of the measured substance conducted in the tube with a change in a (measurement) phase difference of the first useful signal components, viz., a difference between a phase angle of the first useful signal component of the first vibration signal and a phase angle of the first useful signal component of the second vibration signal, and that the measuring system electronics unit is configured to generate, on the basis of the (measurement) phase difference of the first useful signal components, mass-flow measured values representing the mass flow.

According to a thirty-third embodiment of the invention, it is furthermore provided that, in the measuring system electronics unit, a phase-difference-to-measured-value characteristic curve function is configured, according to which the measuring system electronics unit can determine or determines, on the basis of the measurement phase difference, measured values representing the at least one flow parameter of the measured substance, viz., especially, mass-flow measured values representing the mass flow of the measured substance, especially, in such a way that the first and second modal dampings are taken into account in the phase-difference-to-mass-flow-measured-value characteristic curve function or that the (damping) correction value is contained in the phase-difference-to-mass-flow-measured-value characteristic curve function.

According to a thirty-fourth embodiment of the invention, it is furthermore provided that, in the measuring system electronics unit, a phase-difference-to-measured-value characteristic curve function is configured, according to which the measuring system electronics unit can determine or determines, on the basis of the measurement phase difference, measured values representing the at least one flow parameter of the measured substance, viz., especially, mass-flow measured values representing the mass flow of the measured substance, especially, in such a way that the first and second modal dampings are taken into account in the phase-difference-to-mass-flow-measured-value characteristic curve function or that the (damping) correction value is contained in the phase-difference-to-mass-flow-measured-value characteristic curve function, in such a way that the first and second modal dampings are taken into account in the phase-difference-to-mass-flow-measured-value characteristic curve function or the (damping) correction value is contained in the phase-difference-to-mass-flow-measured-value characteristic curve function, especially, in such a way that the phase-difference-to-mass-flow-measured-value characteristic curve function contains a product of a second power of the first modal damping and a reciprocal of the second modal damping and/or a product of a second power of the reciprocal of the quality of the first useful vibrations and the quality of the second useful vibrations.

According to a thirty-fifth embodiment of the invention, it is furthermore provided that, in the measuring system electronics unit, a phase-difference-to-measured-value characteristic curve function is configured, according to which the measuring system electronics unit can determine or determines, on the basis of the measurement phase difference, measured values representing the at least one flow parameter of the measured substance, viz., especially, mass-flow measured values representing the mass flow of the measured substance, especially, in such a way that the first and second modal dampings are taken into account in the phase-difference-to-mass-flow-measured-value characteristic curve function or that the (damping) correction value is contained in the phase-difference-to-mass-flow-measured-value characteristic curve function, in such a way that the measuring system electronics unit is configured to check phase-difference-to-mass-flow-measured-value characteristic curve function by means of the at least one of the first and second vibration signals and/or the drive signal, especially by using the (damping) correction value.

According to a thirty-sixth embodiment of the invention, it is furthermore provided that, in the measuring system electronics unit, a phase-difference-to-measured-value characteristic curve function is configured, according to which the measuring system electronics unit can determine or determines, on the basis of the measurement phase difference, measured values representing the at least one flow parameter of the measured substance, viz., especially, mass-flow measured values representing the mass flow of the measured substance, especially, in such a way that the first and second modal dampings are taken into account in the phase-difference-to-mass-flow-measured-value characteristic curve function or that the (damping) correction value is contained in the phase-difference-to-mass-flow-measured-value characteristic curve function, and/or that the measuring system electronics unit is furthermore configured to perform a (self-)diagnosis and/or a (re)calibration of the measuring system by using the (damping) correction value, especially, in a transducer integrated in a tube line system and/or by means of a measuring system electronics unit electrically connected to the transducer.

According to a thirty-seventh embodiment of the invention, it is furthermore provided that the measuring system electronics unit is configured to determine, on the basis of at least one of the first and second vibration signals, a first speed value, which represents a first vibration speed, viz., a speed of the vibration movements of the at least one tube carrying out the first useful vibrations, especially, to store it in a non-volatile data memory.

According to a thirty-eighth embodiment of the invention, it is furthermore provided that the measuring system electronics unit is configured to determine at least one second speed value, which represents a second vibration speed, viz., a speed of the vibration movements of the at least one tube carrying out the second useful vibrations, especially, to store it in a non-volatile data memory.

According to a thirty-ninth embodiment of the invention, it is furthermore provided that the measuring system electronics unit is configured to determine at least one, especially, digital, first current measured value representing the first (useful) current component, especially a (current) amplitude of the first (useful) current component or an effective value of the first (useful) current component, especially, to store it in a non-volatile data memory.

According to a fortieth embodiment of the invention, it is furthermore provided that the measuring system electronics unit is configured to determine at least one, especially, digital, second current measured value representing the second (useful) current component, especially an amplitude of the second (useful) current component or an effective value of the second (useful) current component, especially, to store it in a non-volatile data memory.

According to a forty-first embodiment of the invention, it is furthermore provided that, in the measuring system electronics unit, a phase-difference-to-measured-value characteristic curve function is configured, according to which the measuring system electronics unit can determine or determines, on the basis of the measurement phase difference, measured values representing the at least one flow parameter of the measured substance, viz., especially, mass-flow measured values representing the mass flow of the measured substance. In addition, the measuring system electronics unit is moreover configured to determine, on the basis of at least one of the first and second vibration signals, a first speed value, which represents a first vibration speed, viz., a speed of the vibration movements of the at least one tube carrying out the first useful vibrations, and at least one second speed value, which represents a second vibration speed, viz., a speed of the vibration movements of the at least one tube carrying out the second useful vibrations, especially, to store them in a non-volatile data memory, and to determine, on the basis of the drive signal, at least one, especially, digital, first current measured value representing the first (useful) current component, especially, a (current) amplitude of the first (useful) current component or an effective value of the first (useful) current component, and at least one, especially, digital, second current measured value representing the second (useful) current component, especially an amplitude of the second (useful) current component or an effective value of the second (useful) current component, especially, to store them in a non-volatile data memory, and to determine, by means of the first and second speed values and the first and second current measured values, at least one, especially, digital, (damping) correction value for the measurement phase difference or measured values provisionally determined on the basis of said measurement phase difference, especially, as a function of the first vibration speed, a second power of a (current) amplitude of the second (useful) current component (eN2), a reciprocal of a (current) amplitude of the first (useful) current component (eN1), and a reciprocal of a second power of the second vibration speed.

According to a forty-second embodiment of the invention, it is furthermore provided that the measuring system electronics unit has a non-volatile data memory (EEPROM) which is configured to hold digital data, viz., especially, the first quality value and/or the (damping) correction value, especially also without an applied operating voltage.

According to a forty-third embodiment of the invention, it is furthermore provided that vibration exciter is formed by means of a vibration coil having, especially, an air coil and an armature.

According to a forty-forth embodiment of the invention, it is furthermore provided that each of the first and second vibration sensors is respectively formed by means of a plunger coil having, especially, an air coil and an armature.

According to a forty-fifth embodiment of the invention, it is furthermore provided that vibration exciter has a magnetic armature, formed especially by means of a permanent magnet, and a coil flooded by the magnetic field of the armature, viz., especially, an air coil; this, for example, in such a way that the magnetic armature is mechanically connected to the at least one tube to form the drive point, and/or that the coil is electrically connected to the measuring system electronics unit and is configured to receive the drive signal and to conduct the first and second (useful) currents thereof.

According to a forty-sixth embodiment of the invention, it is furthermore provided that the measuring system electronics unit is configured to follow a change in a density of the measured substance conducted in the tube with a change in the first (AC) frequency of the drive signal, and that the measuring system electronics unit is configured to generate, on the basis of the first (AC) frequency of the drive signal and/or on the basis of the signal frequency of the first useful signal component of at least one of the vibration signals, density measured values representing the density.

According to a forty-seventh embodiment of the invention, it is furthermore provided that the measuring system electronics unit is configured to provide the drive signal (e1) with the second (useful) current component (eN2) during a test interval that especially lasts more than 10 ms and/or is time-limited and/or recurrently started, with a sinusoidal having a second (AC) frequency; this, for example, also in such a way that the test interval lasts in each case longer than 100 ms (milliseconds), especially not less than 1 s (second), and/or that the measuring system electronics unit is configured to automatically, especially in a time-controlled manner, start and/or end the test interval, especially repeatedly, and/or that the measuring system electronics unit is configured to receive and execute one or more commands that start the test interval.

According to a forty-eighth embodiment of the invention, it is furthermore provided that the tube wall consist of a steel, especially, a stainless steel, duplex steel, or super duplex steel, of a titanium alloy and/or a zirconium alloy, especially, a Zircaloy, and/or a tantalum alloy.

According to a forty-ninth embodiment of the invention, it is furthermore provided that the tube has a caliber (inner tube diameter) that is more than 0.1 mm, viz., especially, more than 0.5 mm; this, for example, also in such a way that the tube has a caliber-to-tube-length ratio that is more than 0.08, especially, more than 0.1, and/or less than 0.25, especially, less than 0.2, and/or that the tube length of the tube is more than 200 mm, especially, more than 500 mm, and/or less than 2,000 mm, especially, less than 1,500 mm, and/or that the tube has a caliber that is more than 10 mm, viz., especially, more than 15 mm.

According to a fiftieth embodiment of the invention, it is furthermore provided that, apart from the vibration exciter, the exciter assembly has no further vibration exciter connected to the tube.

According to a fifty-first embodiment of the invention, it is furthermore provided that the vibration exciter is positioned and aligned such that the drive offset is less than 0.5 mm, viz., especially, zero, or that the area centroid of the drive cross-sectional area of the tube corresponds to or coincides with the drive reference point.

According to a fifty-second embodiment of the invention, it is furthermore provided that each of the first-order and second-order vibration modes of the tube respectively has a first vibration node located in the first tube end of the at least one tube and a second vibration node located in the second tube end of the at least one tube.

According to a fifty-third embodiment of the invention, it is furthermore provided that the tube is curved sectionally, especially, in the shape of a circular arc and/or V, especially, in such a way that the tube has a central vertex arc segment and/or that exactly one main inertia axis of the at least one tube is within the reference cross-sectional area of the at least one tube.

According to a fifty-fourth embodiment of the invention, it is furthermore provided that the tube is straight sectionally, especially, over the entire tube length, especially, in such a way that the three main inertia axes of the at least one tube are within the reference cross-sectional area of the at least one tube, and/or a center of mass is within the reference cross-sectional area of the at least one tube.

According to a fifty-fifth embodiment of the invention, it is furthermore provided that the tube assembly has at least one second tube, which is, especially, at least sectionally curved and/or at least sectionally straight, and/or is structurally identical to the first tube and/or is at least sectionally parallel to the first tube. Developing this embodiment further, it is furthermore provided that the vibration exciter is mechanically connected both partially to the first tube and partially to the second tube, and/or that the vibration exciter is configured to act differentially on the first and second tubes, especially, in such a way that the first and second tubes simultaneously perform opposite, forced mechanical vibrations of equal frequency, and/or that the vibration exciter is configured to convert electrical power with a temporally variable electrical current into mechanical power such that a temporally variable drive force acts on the second tube at a drive point formed by means of the vibration exciter on the second tube mechanically connected thereto, especially, simultaneously and/or oppositely to the drive force acting on the first tube at the drive point formed by means of the vibration exciter on the first tube mechanically connected thereto, and/or that the vibration exciter is configured to simultaneously convert electrical power fed in by means of the electrical drive signal into forced mechanical vibrations of the first and second tubes, especially, in such a way that the first and second tubes simultaneously perform forced mechanical vibrations at the first useful frequency and/or at the second useful frequency.

A basic idea of the invention consists in also actively exciting, at least intermittently, during the operation of vibronic measuring systems of the type in question, not least for the purpose of compensating measurement errors dependent on variable substance parameters of the respective measured substance, by means of the at least one vibration exciter (arranged centrally of the at least one tube), apart from the typically excited useful vibrations according to an odd-order (flexural) vibration mode, useful vibrations, viz., for example, flexural vibrations, according to an even-order vibration mode and therefore such a natural vibration mode of the at least one tube that (nominally) has a vibration node located at the vibration exciter or its immediate vicinity, viz., for example, a second-order (flexural) vibration mode (f2 mode) and/or a fourth-order (flexural) vibration mode (f4 mode).

The invention is also, inter alia, based on the surprising finding that, due to the drive offset, which is typically very low, nevertheless also regularly non-zero in the case of an original or intact transducer, the aforementioned useful vibrations corresponding to the even-order vibration mode in an active excitation to the respective resonance frequency of said vibration mode, viz., for example, the resonance frequency (f2) of the second-order (flexural) vibration mode (f2 mode), have a rather small, nevertheless regularly sufficiently well-measurable amplitude or, accordingly, also a well-measurable (modal) damping; this, in particular, also to the extent that, based on the respective modal dampings of both excited useful vibrations, the aforementioned drive offset or the influence of one or more substance parameters of the measured substance on the respective measurement error caused thereby can be determined with a measuring system according to the invention during operation, for example also in the course of a (self-)adjustment of the measuring system ("autozero"), and/or in such a way that the influence of the drive offset is taken into account in the determination of the measured values in a corresponding manner. Moreover, it has also been recognized that it is also possible, based on one or more such actively excited even-order (flexural) vibration modes, viz., for example, the f2 mode, in combination with one or more timely or also simultaneously actively excited odd-order vibration modes, viz., for example, a typically excited first-order (flexural)

vibration mode (f1 mode) or third-order (flexural) vibration mode (f3 mode) or on the basis of the respective drive signal and at least one of the corresponding vibration signals, to also quantitatively determine the aforementioned phase error, which typically occurs in conventional measuring systems as a systematic (measurement) deviation dependent on one or more substance parameters of the measured substance, "on-the-fly," viz., during ongoing operation of the respective measuring system, at least approximately in the form of a (damping) correction value; this, for example, also in order to correspondingly update the (damping) correction value in the case of a change in the phase error, for example as a result of changing substance parameters of the measured substance, not least also the viscosity.

In addition, it has been recognized that, conversely, a change in the drive offset associated with a displacement of the aforementioned vibration node closest to the vibration exciter, during the use of the respective measuring system, for example, due to changing geometric or mechanical properties of the tube or of the transducer formed therewith, relative to the original drive offset, viz., for example, the drive offset effective for the (first) calibration of the measuring system, also has the result that the modal dampings of the useful vibration in the same excitation also, inter alia, can change in comparison to the respectively initially measured damping; this, in particular, such that when the drive offset increases, the modal damping of the odd-order (flexural) bending mode (f1 mode) increases or the modal damping of the even-order (flexural) bending mode (f2 mode) decreases. Thus, based on the useful vibrations according to the even-order vibration mode, a (self-)diagnosis, for example within the meaning of a check of the functionality of the measuring system or a verification of the measuring system ("pass/fail") can also additionally be performed very easily. For the purpose of such a (self-)diagnosis of the measuring system, the vibration responses generated by active excitation of useful vibrations according to the even-order vibration mode, or (system) parameters characterizing them, possibly also together with the vibration responses generated by the useful vibrations according to the odd-order vibration mode can advantageously be very easily determined recurrently during operation of the measuring system and compared to corresponding reference vibration responses ("fingerprint") or reference values therefor, for example, in such a way that in the case of increased deviations, or deviations exceeding a specified tolerance measure, from the corresponding reference values, the presence of a fault of the measuring system is detected, possibly also reported; this advantageously also simultaneously with the actual measuring operation, without considerably influencing the latter or without having to interrupt the measuring operation for a longer duration for this purpose.

Another advantage of the invention consists in realizing both the compensation or correction according to the invention of the phase error and the aforementioned (self-)diagnosis, even using largely, and possibly also exclusively, the proven designs for conventional vibronic measuring systems, not least also for the transducers installed therein up until now, while likewise largely retaining proven technologies and architectures of established measuring system electronics unit; for example, also in such a way that conventional, and possibly also already installed, measuring systems can be retrofitted by corresponding reprogramming of the respective measuring system electronics unit.

BRIEF DESCRIPTION OF THE DRAWINGS

The invention as well as advantageous embodiments thereof are explained in more detail below based on exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, especially, combinations of partial aspects of the invention that were initially explained only separately, furthermore result from the figures of the drawing and/or from the claims themselves.

The figures show in detail.

DETAILED DESCRIPTION

Figure 1:
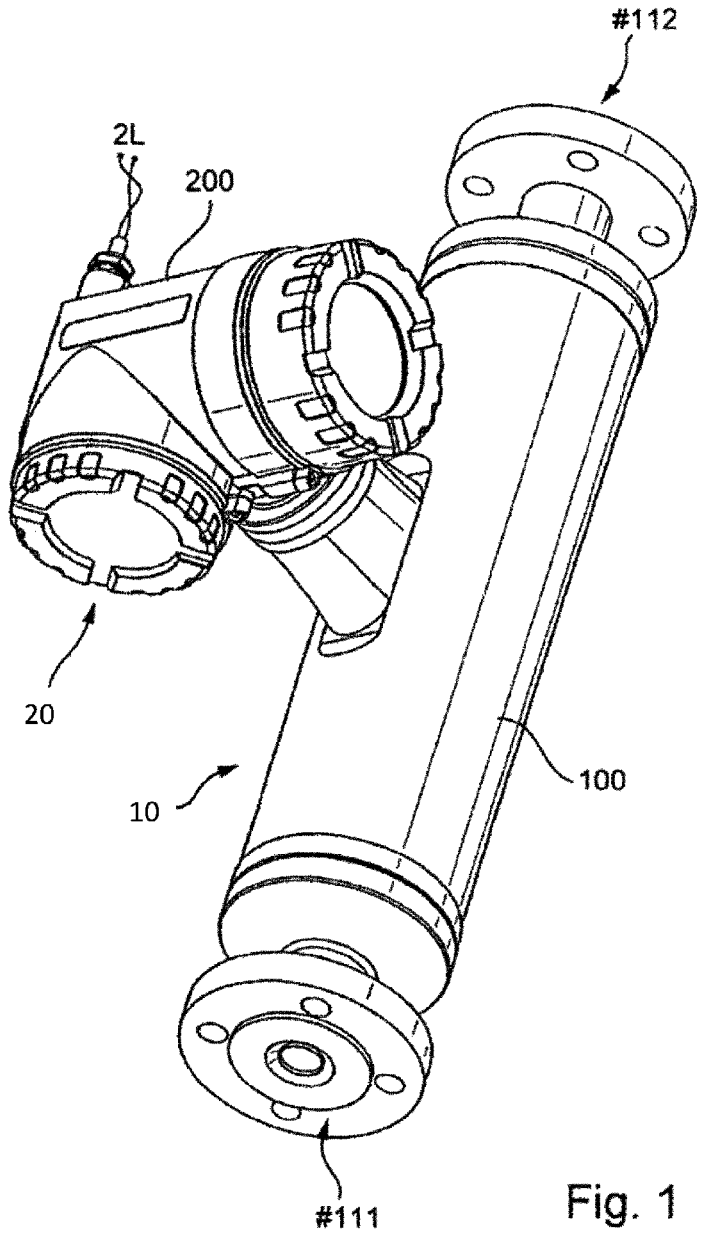
FIG. 1 shows a perspective side view of an exemplary embodiment of a vibronic measuring system according to the present disclosure.
Figure 2:
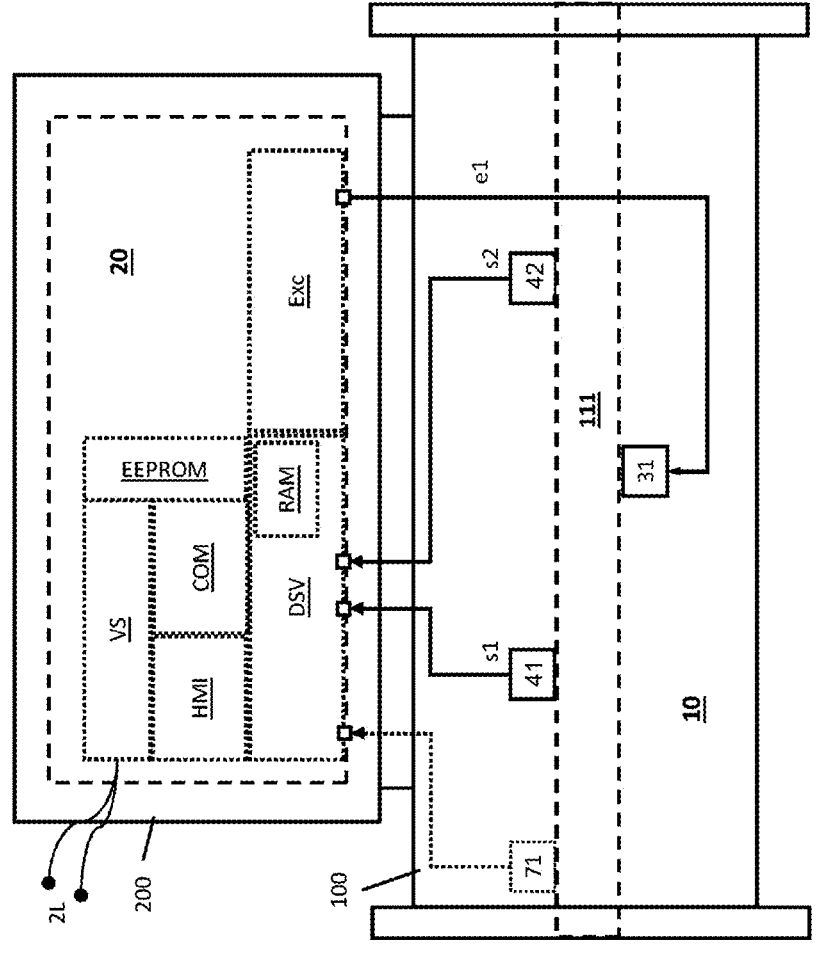
FIG. 2 shows a schematic, in the manner of a block diagram, of an exemplary embodiment of a vibration-type transducer suitable for a vibronic measuring system according to FIG. 1, and a measuring system electronics unit electrically coupled thereto.
Figure 3:
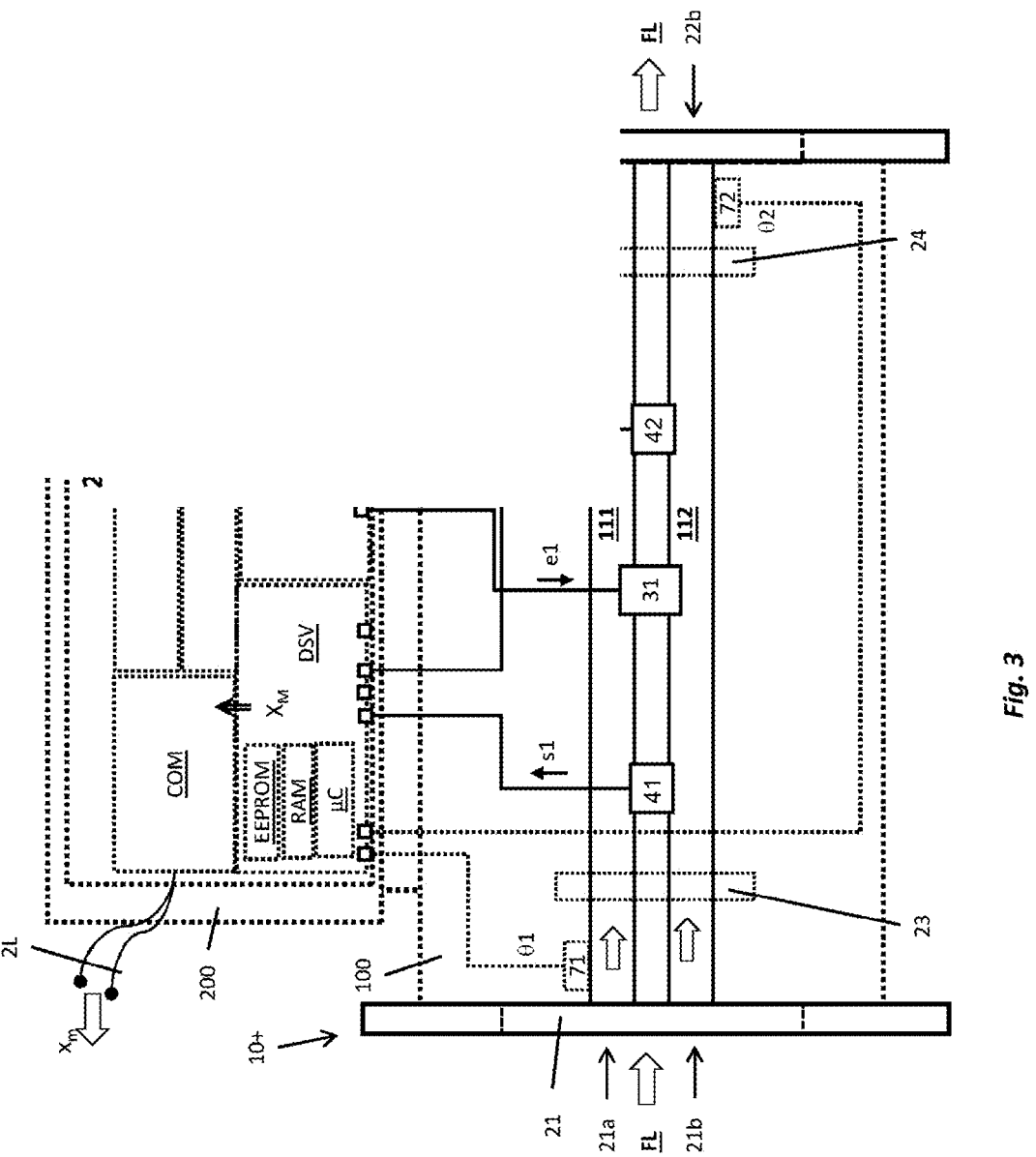
FIG. 3 shows a schematic, in the manner of a block diagram, of a further exemplary embodiment of a vibration-type transducer suitable for a vibronic measuring system according to FIG. 1, and a measuring system electronics unit electrically coupled thereto.

FIG. 1 or 2 and 3 schematically show exemplary embodiments or embodiment variants for a vibronic measuring system used to measure and/or monitor at least one, especially temporally-variable, measured variable of a fluid, e.g., at least intermittently flowing and/or at least intermittently two- or multi-phase or inhomogeneous, measured substance FL, wherein the measured variable can, for example, be a flow parameter, such as a mass flow m, a volumetric flow and/or a flow rate, or, for example, a substance parameter, such as a density $\rho$ and/or a viscosity $\eta$, of the measured substance FL. The measuring system is especially provided or configured to be integrated into the course of a process line conducting a fluid FL used as a measured substance, viz., for example, a gas, a liquid, or a dispersion, and to be at least intermittently flowed through during operation by the fluid FL supplied or discharged via the process line. Moreover, the measuring system is provided to determine, viz., especially to calculate and/or output, measured values $X_M$, and optionally also digital measured values, (chronologically successively) quantifying the at least one physical measured variable. The process line may, for example, be a component of an possibly also extensive and/or branched line system and/or a tube line or hose line, viz., for example, a tube line of a filling plant or a refueling apparatus or, for example, also a hose line in a biotechnological installation.

As shown respectively in FIGS. 1, 2, and 3, or readily apparent from their combination, the measuring system comprises a vibration-type transducer 10, viz., a transducer with a tube assembly formed by means of at least one (first) or several tubes for conducting the measured substance, an exciter assembly (31) for converting electrical power to excite and maintain forced mechanical vibrations of the at least one tube, and a sensor assembly (41, 42) for detecting mechanical vibrations of the tube assembly and for providing vibration signals (s1, s2), e.g., electrical or optical vibration signals, respectively representing vibration movements of the tube assembly, viz., especially, of the one or more tubes thereof. In addition, the measuring system furthermore comprises a measuring system electronics unit 20, which is electrically coupled to the transducer 10, viz., both to the aforementioned exciter assembly of the transducer and to the aforementioned sensor assembly of the transducer, viz., for example, by means of corresponding electrical connecting lines, especially, formed by means of at least one microprocessor ($\mu$C) and/or arranged in an electronics protective housing (200) and/or used as a transmitter, for controlling the transducer, viz., especially to cause the aforementioned mechanical vibration of the at least one tube and to evaluate vibration signals supplied by the transducer, viz., for example, to determine the aforementioned measured values. The measuring system electronics unit 20 may, for example, be designed to be programmable and/or remotely parameterizable, viz., for example, correspondingly formed by means of at least one microprocessor and/or at least one digital signal processor (DSP) and/or by means of a programmable logic component (FPGA) and/or by means of a customer-specifically programmed logic module (ASIC). Furthermore, the measuring system electronics unit 20 can be supplied with the electrical energy required during operation by means of internal energy stores and/or from outside the measuring system electronics unit 20 via a connecting cable. The electrical coupling or connection of the transducer 10 to the measuring system electronics unit 20 may take place by means of corresponding electric connecting lines and corresponding cable feedthroughs. In this case, the connecting lines can be formed at least partially as electric conductor wires sheathed at least in some sections by electric insulation, for example in the form of "twisted pair" lines, ribbon cables, and/or coaxial cables. As an alternative or in addition thereto, the connecting lines can also be formed at least in some sections by means of printed conductors of a printed circuit board, especially a flexible, optionally varnished printed circuit board.

Moreover, as also shown schematically in FIG. 1, the measuring system electronics unit 20 may, for example, be accommodated in a corresponding, separate, electronics protective housing 200, which is especially impact-resistant and/or also explosion-resistant and/or at least protects against spray water, and can moreover be designed such that, during operation of the measuring system, it can exchange measurement and/or other operating data, e.g., also status messages, such as respectively current measured values or setting and/or diagnosis values used to control the measuring system (FIGS. 2 and 3), with a superordinate electronic (measurement) data processing system (not shown here), e.g., a programmable logic controller (PLC), a process control system (PLS), a remote terminal unit (RTU), or a supervisory control and data acquisition (SCADA) process executed on a personal computer (PC) and/or a workstation, via a data transmission system—for example, a fieldbus system, and/or wirelessly via radio. Accordingly, the measuring system electronics unit 20 may, for example, have such a transmitting and receiving circuit COM, which is fed during operation by a (central) evaluation and supply unit provided in the aforementioned data processing system and remote from the measuring system. For example, the measuring system electronics unit 20 (or its aforementioned transmitting and receiving electronics COM) may moreover be designed such that it can be connected electrically to the aforementioned external electronic data processing system via a two-conductor connection 2L, optionally also configured as a 4-20 mA current loop, and, via said connection, can both obtain the electrical power required for operating the measuring system from the aforementioned evaluation and supply unit of the data processing system and transmit measured values, optionally digitized measured values, to the data processing system—for example, by (load) modulation of a direct supply current fed by the evaluation and supply unit. Moreover, the measuring system electronics unit 20 may also be designed such that it can be operated nominally at a maximum power of 1 W or less and/or is intrinsically safe. Moreover, the measuring system electronics unit 20 may, for example, also be constructed in a modular manner in such a way that various electronic components of the measuring system electronics unit 20, such as a measurement and evaluation circuit DSV formed, for example, by means of one or more microprocessors and/or by means of one or more digital signal processors, for processing and evaluating the measurement signals provided by the transducer 10, and not least the vibration signals, a driver circuit Exc for controlling the transducer 10 or the exciter assembly thereof, an internal power supply circuit VS for providing one or more internal operating voltages, and/or the aforementioned transmitting and receiving circuit COM used to communicate with the aforementioned superordinate (measurement) data processing system or the aforementioned external fieldbus, are respectively arranged on one or more separate circuit boards and/or are respectively formed by means of one or more separate microprocessors.

As can be respectively seen from FIGS. 2 and 3, the aforementioned transmitting and receiving circuit COM may, for example, also be provided for one of the outputs ($x_m$) of measured values ($X_M$) determined internally by the measuring system—for example, by the aforementioned measurement and control circuit DSV. Accordingly, the transmitting and receiving circuit COM may moreover be configured to convert received measured values $X_M$ into an output signal $x_m$ providing said measured value $X_M$, e.g., an output signal complying with an industry standard, viz., for example, DIN IEC 60381-1:1985-11, IEC 61784-1 CPF1 (Foundation Fieldbus), IEC 61784-1 CPF3 (Profibus), IEC 61158, or IEC 61784-1 CPF9 (HART). In order to visualize measured values ($X_M$) generated internally by the measuring system and/or status messages generated internally by the measuring system, such as an error message or an alarm, on-site, the measuring system may furthermore have a display and operating element HMI, such as an LCD, OLED, or TFT display positioned in the aforementioned electronics housing 200 behind a window provided correspondingly therein, which HMI also communicates at least intermittently with the measuring system electronics unit 20, and a corresponding input keyboard and/or a touchscreen.

The program codes executed during operation of the measuring system in the measuring system electronics unit 20, viz., for example, in one or more of the aforementioned microprocessors or digital signal processors of the measuring system electronics unit 20, can respectively be stored persistently, for example, in one or more non-volatile data memories (EEPROM) of the measuring system electronics unit 20, viz., memories storing digital data even without an applied operating voltage, and, when said measuring system electronics unit is started up, can be loaded into a volatile data memory (RAM) provided, e.g., integrated into the microprocessor, in the measuring system electronics unit 20 or in the aforementioned measurement and evaluation circuit DSV. For processing in the microprocessor or in the digital signal processor, the vibration signals s1, s2 are of course first to be converted into corresponding digital signals by means of corresponding analog-to-digital converters (A/D), viz., for example, by, respectively, suitably digitizing the respective signal voltage of each of the vibration signals s1, s2, which are electrical here; cf. in this respect, for example, the aforementioned U.S. Pat. No. 6,311,136. Accordingly, corresponding analog-to-digital converters for the vibration signals s1, s2 and/or at least one non-volatile electronic data memory EEPROM, which is configured to store digital data, viz., for example, even without an applied operating voltage, can be stored in the measuring system electronics unit 20, viz., for example, in the aforementioned measurement and evaluation circuit DSV.

According to a further embodiment of the invention, the measuring system furthermore comprises a support frame 100, especially a bending- and/or torsion-resistant support frame, wherein, as is also schematically shown in FIG. 1, 2, or 3, said support frame 100 and the tube assembly are fastened to one another, for example, by material bonding or also detachably, as inter alia shown in the aforementioned WO-A 2019/017891. In order to protect the transducer or its components from harmful environmental influences, to avoid undesired sound emissions by the vibrating tubes, or to collect measured substance escaping from a leak-tight tube assembly, the aforementioned support frame 100 can also be designed, as quite customary in vibronic measuring systems of the type in question, as a transducer protective housing that surrounds the tube assembly, together with the exciter assembly and sensor assembly, e.g., also in such a way that said transducer protective housing is metallic and/or has a compressive strength that is greater than a greatest compressive strength of the at least one tube of the tube assembly and/or is more than 50 bar. The exciter assembly and/or the sensor assembly can also be attached partially to the support frame or to the transducer protective housing. In the aforementioned case in which the measuring system electronic unit 20 is accommodated within an electronics protective housing 200, the latter may, for example, also be fastened to the aforementioned support frame or to the outside of the transducer protective housing of the transducer, as also shown schematically in FIGS. 1, 2, and 3 or easily apparent from the combination thereof.

The at least one tube of the tube assembly can be straight at least sectionally, viz., especially hollow cylindrical, and/or curved at least sectionally, e.g., in such a way that said tube has a central vertex arc segment, viz., especially is substantially V-shaped or has a V-shaped silhouette, and/or that the tube ultimately has a tubular shape located in a single (tube) plane. As indicated in FIG. 2, the at least one tube extends from a first tube end to a second tube end with a tube length corresponding to a length of an imaginary center line of the tube, e.g., of more than 100 mm, and the tube has a lumen, which is enclosed by a tube wall and extends from the first tube end to the second tube end. According to a further embodiment of the invention, the tube length of the tube is more than 200 mm, e.g., also more than 500 mm, and/or less than 2,000 mm—for example, also less than 1,500 mm. In the case of an at least sectionally curved tube, the aforementioned tube length corresponds to an extended or unwound length of the tube, and the tube can be manufactured by bending a tubular, semi-finished product.

According to a further embodiment of the invention, the tube wall of the at least one tube consists of a metal, viz., for example, a steel, especially a stainless steel, duplex steel, or super duplex steel, a titanium alloy and/or a zirconium alloy, especially a Zircaloy, and/or a tantalum alloy and/or a nickel-based alloy. Moreover, the at least one tube of the tube assembly can be designed in one piece—for example, in such a way that the tube is produced seamlessly or (at least in the case of a tube wall made of metal) with a single welded seam. According to a further embodiment of the invention, the at least one tube of the tube assembly has a caliber (inner tube diameter) that is more than 0.1 mm, viz., for example, also more than 0.5 mm, and/or the tube wall of the at least one tube has a smallest wall thickness that is not less than 0.5 mm, e.g., also more than 1.5 mm, and this especially such that the wall thickness of the tube wall is substantially uniform. According to a further embodiment of the invention, the tube has a caliber-to-tube-length ratio that is more than 0.08, especially, more than 0.1, and/or less than 0.25, especially, less than 0.2. Incidentally, the at least one tube or each of the tubes of the tube assembly may, however, also assume any other one of the geometric shapes and/or dimensions customary in conventional (standard) vibronic measuring systems, viz., for example, 1 mm, 2 mm, 5 mm, 10 mm, 15 mm, or even more, and/or may be produced from further materials customary for this purpose.

According to a further embodiment of the invention, the tube assembly of the transducer 10 has at least one second tube 112, as shown schematically in FIG. 3. The tube 112 may be at least sectionally curved and/or at least sectionally straight. Moreover, the tube 112, as indicated in FIG. 3, may, for example, also be designed structurally identically to the tube 111 and/or be arranged in parallel to the tube 111 at least sectionally. The tube 112 likewise extends, like the tube 111, from a first tube end to a second tube end with a tube length and likewise has, like the tube 111, a lumen, which is enclosed by a tube wall, e.g., a metallic tube wall, and extends from the first tube end to the second tube end. Moreover, the tube 112 is likewise designed to be flowed through by measured substance or a partial volume thereof at least in a flow direction from the first tube end to the second tube end, especially simultaneously with the first tube, and, meanwhile, to be allowed to vibrate. In addition, the tube assembly can furthermore have a first, and/or inlet-side, flow divider 21, which is, for example, used as a line-branching unit here, and has at least two flow openings, and a second, and/or outlet-side, flow divider 22, which is, for example, structurally identical to the aforementioned flow divider 21 and/or used as a line-merging unit, and has likewise at least two flow openings, and each of the tubes 111, 112 of the tube assembly can then respectively be connected to each of the first and second flow dividers to form two, fluidically parallel flow channels, e.g., in such a way that the tube 111 opens with its first tube end into a first flow opening 21a of the first flow divider 21 and with its second tube end into a first flow opening 22a of the second flow divider 22, and that the second tube 112 opens with its first tube end into a second flow opening 21b of the first flow divider 21 and with its second tube end into a second flow opening 22b of the second flow divider 22. The tube length of the tube 111 may, for example, be equal to the tube length of the tube 112. Furthermore, the tube assembly may also have further tubes, viz., for example, two further tubes, and therefore, as also shown in, inter alia, the above-mentioned U.S. Pat. No. 5,602,345, WO-A 96/08697, 2017/0356777, WO-A 2019/081169, or WO-A 2019/081170, a total of four tubes. Accordingly, both the flow divider 21 and the flow divider 22 respectively have, especially exactly, four flow openings, and each of the tubes of the tube assembly can be respectively connected to each of the flow dividers 21, 22 to form four, fluidically parallel flow paths. In the aforementioned case in which the tube assembly has four tubes, the tubes may, for example, also be designed such that they are structurally identical only in pairs, viz., for example, the tube lengths are selected to be of equal size only in pairs. Moreover, for the case in which the tube assembly has two or more tubes, the wall of each of the tubes may, for example, consist of the same material, as is quite customary in the case of tube assemblies of the type in question or transducers or measuring systems formed therewith; this, for example, also in such a way that the tube wall of each of the tubes of the tube assembly have a wall thickness that is equal to a wall thickness of the other tube or of each of the other tubes and/or that each of the tubes of the tube assembly have a caliber, viz., an inner diameter, that is equal to a caliber of the other tube or of each of the other tubes.

As already indicated, the tube assembly or the transducer MW formed therewith is provided especially to be connected via an inlet end 10+, e.g., also enclosed by a first connecting flange, of the tube assembly or of the transducer MW and a corresponding outlet end 10#, e.g., enclosed by a second connecting flange, to the aforementioned process line and to be flowed through during operation by the measured substance FL. Moreover, a sealing surface may respectively be formed at each of the aforementioned connecting flanges. In the aforementioned case in which the tube assembly has at least two tubes and the two flow dividers respectively connected thereto, the inlet end 10+ of the tube assembly is correspondingly formed by means of the flow divider 21, and the outlet end 10# of the tube assembly is correspondingly formed by means of the flow divider 22, and accordingly, the flow divider 21 can have the aforementioned first connecting flange, and the flow divider 22 can have the aforementioned second connecting flange. Moreover, the at least one tube of the tube assembly can furthermore be configured to conduct measured substance FL or a partial volume thereof in its respective lumen, viz., for example, to carry out forced mechanical vibrations, which especially cause a measurement effect corresponding to the at least one measured variable and/or were excited by means of the exciter assembly, about an associated static resting position; this especially such that the at least one tube of the tube assembly is allowed to vibrate and is meanwhile flowed through by measured substance, starting from its first tube end in the direction of its second tube end (flow direction). As is quite customary in the case of transducers of the type in question, the aforementioned forced mechanical vibrations can be at least partially forced flexural vibrations of the at least one tube about an imaginary vibration axis of the tube assembly, viz., for example, a vibration axis imaginarily connecting the first and second tube ends.

Figures 4A, 4B:
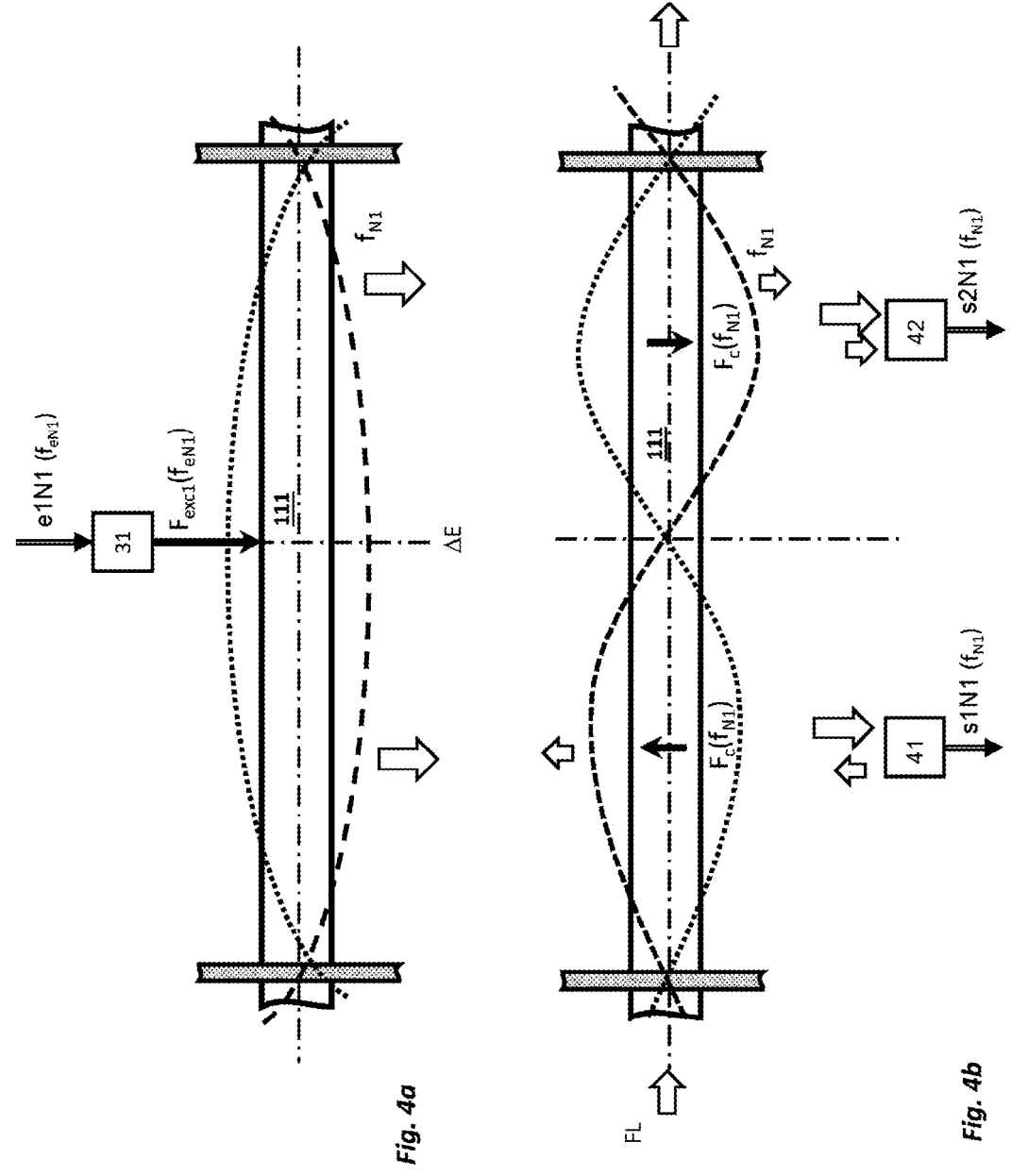
FIG. 4*a* shows a schematic of a tube assembly of a vibration-type transducer suitable for a vibronic measuring system according to FIG. 1, with a tube excited to vibrate to first useful vibrations.
FIG. 4*b* shows a schematic of Coriolis vibrations of the tube, excited in a tube assembly according to FIG. 4 due to useful vibrations and dependent upon the mass flow.

The aforementioned exciter assembly of the transducer 10 in turn is in particular provided or configured to convert electrical power fed thereinto (from the measuring system electronics unit 20) into mechanical power in such a way that, as indicated in FIG. 4a or even easily apparent from a combination of FIGS. 2 and 4a, the at least one tube 111 of the tube assembly and/or each of the tubes thereof performs at least intermittently forced mechanical vibrations about a respective static resting position, while the sensor assembly is provided or configured to detect mechanical vibrations of the tube assembly, not least mechanical vibrations forced by means of the exciter assembly, and/or flexural vibrations of the at least one tube and to provide a first vibration signal s1 and a second vibration signal s2, of which, for example electrical, vibration signals s1, s2, each represents at least partially vibration movements of one or more of the tubes of the tube assembly, for example respectively by means of a respective variable electrical voltage corresponding to vibration movements ($X_{s1}$, $X_{s2}$) of the at least one tube.

The exciter assembly of the measuring system has a vibration exciter 31, e.g., an electrodynamic vibration exciter, which is mechanically connected to the at least one tube and is moreover configured to convert electrical power with a temporally variable electrical current into mechanical power in such a way that, as indicated in FIG. 2 or readily apparent from a combination of FIGS. 2 and 4a, a temporally variable drive force $F_{exc1}$ acts on the tube at a drive point formed by means of said vibration exciter 31 on the tube mechanically connected thereto. In this case, an imaginary circumferential line of the tube, which passes through the aforementioned drive point encloses a cross-sectional area of the tube, which is also referred to below as the drive cross-sectional area of the tube. The measuring system electronics unit 20 in turn is accordingly, inter alia, also configured to energize the vibration exciter 31, viz., to feed electrical power into the vibration exciter 31 by means of an electrical drive signal e1 having a temporally variable electrical current, in such a way that the at least one tube performs forced mechanical vibrations, viz., for example, flexural vibrations, at one or more vibration frequencies specified by the drive signal e1. According to a further embodiment of the invention, the vibration exciter 31 is positioned such that, as indicated in FIG. 4a, a line of action of the aforementioned drive force $F_{exc1}$ is perpendicular to a normal of the drive cross-sectional area of the tube. According to a further embodiment of the invention, the vibration exciter 31 is of the electrodynamic type, viz., formed by means of a vibration coil having, for example, an air coil and an armature, or the vibration exciter 31 has a magnetic armature, formed, for example, by means of a permanent magnet, and a coil flooded by the magnetic field of the armature, viz., for example, an air coil. The magnetic armature can, for example, be mechanically connected to the at least one tube 111 to form the drive point, and/or the coil can be electrically connected to the measuring system electronics unit 20, for example. According to a further embodiment of the invention, it is furthermore provided that, apart from the vibration exciter 31, the exciter assembly has no further vibration exciter connected to the tube 111, as is, for example, also customary in conventional vibronic (standard) measuring systems.

In the aforementioned case in which the tube assembly has at least two tubes, the vibration exciter 31 may accordingly, moreover, also be configured to convert electrical power fed in by means of the electrical drive signal e1 into forced mechanical vibrations of the first and second tubes 111, 112; this, especially, such that the vibration exciter 31 acts differentially on the two tubes 111, 112, viz., can introduce or introduces only excitation forces in opposition into the two tubes 111, 112, e.g., in such a way that the first and second tubes 111, 112 simultaneously perform opposite, forced mechanical vibrations of equal frequency, viz., especially, forced mechanical vibration in opposition. The vibration exciter 31 can accordingly be mechanically connected, for example, both to the tube 111 and to the tube 112, viz., for example, in such a way that the aforementioned drive force acts on both the tube 111 and the tube 112. Moreover, the vibration exciter 31 may also be configured to convert electrical power with a temporally variable electrical current into mechanical power such that a temporally variable drive force acts on the second tube at a drive point formed by means of the vibration exciter 31 on the second tube 112 mechanically connected thereto, viz., for example, simultaneously with and/or oppositely to the drive force acting on the tube 111 at the drive point formed by means of said vibration exciter 31 on the tube 111 mechanically connected thereto. In the aforementioned case in which the vibration exciter 31 is formed by means of a coil electrically connected to the measuring system electronics unit, energizing the vibration exciter 31 means that the coil receives the drive signal e1, viz., the current thereof.

The sensor assembly of the measuring system in turn has, as also schematically shown in FIG. 2, a first vibration sensor 41, especially, an electrodynamic or optical first vibration sensor, and a second vibration sensor 42, especially, an electrodynamic or optical second vibration sensor. Each of the vibration sensors 41, 42, which, for example, are also structurally identical, is respectively positioned on the tube, viz., especially, respectively mechanically connected at least partially to the tube, and is moreover configured to detect vibration movements ($\underline{X}s1$; $\underline{X}s2$) of the at least tube (at selective points) and to convert them into a first vibration signal s1, for example, an electrical or optical first vibration signal, representing said vibration movements, and a second vibration signal s2; this in particular such that each of the first and second vibration signals (s1, s2) respectively contains one or more sinusoidal signal components of a respective frequency corresponding to a vibration frequency of vibration movements of the tube. According to a further embodiment of the invention, it is furthermore provided that each of the vibration sensors 41, 42 be respectively positioned at a distance from the vibration exciter 31 in the flow direction, especially of more than 10 mm and/or more than one fifth of the tube length and/or at the same distance; this especially in such a way that the vibration sensors 41, 42, as also customary in conventional vibronic (standard) measuring systems, are positioned at a distance from one another in the flow direction on the tube. According to a further embodiment of the invention, each of the first and second vibration sensors 41, 42 is respectively formed by means of a plunger coil having, for example, an air coil and an armature. In the aforementioned case in which the tube assembly has at least two tubes, each of the vibration sensors 41, 42 can respectively be positioned both on the first tube 111 and on the second tube 112, viz., especially mechanically connected both partially to the first tube and partially to the second tube, and each of the vibration sensors 41, 42 can moreover be configured to detect, especially differentially, vibration movements, viz., especially, vibration movements in opposition, both of the first tube and of the second tube and convert them into the first or second vibration signal in such a way that each of the vibration signals represents vibration movements, especially, vibration movements in opposition, of the first and second tubes 111, 112 (FIG. 3); this especially also in the aforementioned case in which the vibration sensors 41, 42 are respectively electrodynamic vibration sensors constructed in the manner of a plunger coil. In the aforementioned case in which the tube assembly has two tubes, each of the first and second vibration sensors is positioned, according to a further embodiment of the invention, both on the first tube and on the second tube, viz., for example, mechanically connected both partially to the first tube and partially to the second tube. Moreover, each of the first and second vibration sensors is configured to detect vibration movements, viz., for example, vibration movements in opposition, both of the first tube and of the second tube and convert them into the respective first or second vibration signal in such a way that each of the first and second vibration signals represents vibration movements of the first and second tubes. The vibration sensors can in particular be designed such that vibration movements of the tubes, not least also vibration movements in opposition, can be differentially detected therewith and/or that each of the first and second vibration signals respectively represents vibration movements of the first and second tubes in opposition.

Figure 5:
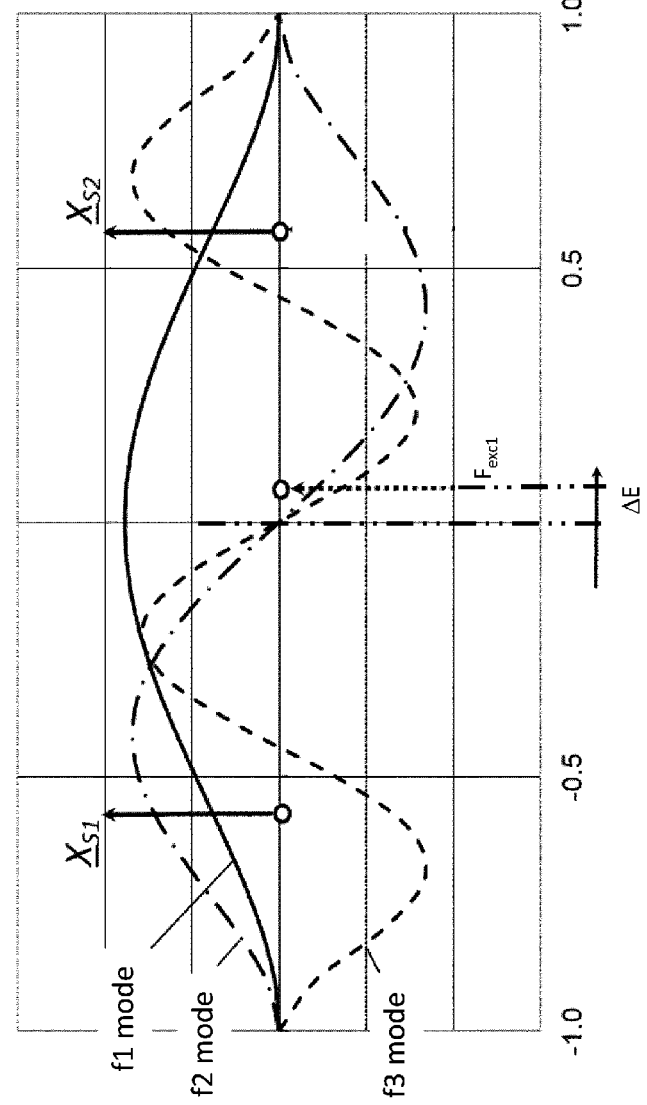
FIG. 5 shows a schematic diagram of first-order, second-order, or third-order vibration modes inherent in a tube of a tube assembly according to FIG. 4.

Inherent in the at least one tube 111 or in the tube assembly formed therewith is, naturally, respectively a plurality of vibration modes (natural vibration forms) which respectively have an associated (modal) damping (D1, D2, . . . , Dx) and a respectively associated resonance frequency (f1, f2, . . . , fx) (co-)determined thereby, and in which the at least one tube 111 can perform or performs vibration movements respectively having one or more vibration antinodes (SB) and two or more vibration nodes (SK), in such a way that the number of vibration nodes is respectively greater than the number of associated vibration antinodes by exactly one. Vibration movements of the at least one tube 111 in a fundamental vibration mode, viz., a first-order vibration mode (f1 mode), viz., for example, a first-order flexural vibration mode, have, as also indicated in FIG. 5, exactly one vibration antinode and, accordingly, two vibration nodes (f1 mode: 1SB, 2SK), while vibration movements of the tube 111 in a harmonic mode (deviating from the fundamental vibration mode), viz., a second-order or higher-order vibration mode (f2 mode, f3 mode, f4 mode, . . . fx mode), viz., for example, a second-order, third-order, fourth-order, or higher-order flexural vibration mode, accordingly have two or more vibration antinodes and, correspondingly, three or more vibration nodes (f2 mode: 2SB, 3SK, f3 mode: 3SB, 4SK, f4 mode: 4SB, 5SK, . . . , fx mode: x·SB, [x+1]·SK). In this case, each of the aforementioned vibration modes and therefore also the first-order, second-order, or third-order vibration modes (f1 mode, f2 mode, f3 mode), has a first vibration node located in the first tube end of the at least one tube and a second vibration node located in the second tube end of the at least one tube (FIG. 5). In the aforementioned case in which the tube assembly has two or more tubes, and also quite customary in conventional vibronic (standard) measuring systems, the tube assembly may, furthermore, have coupling elements used to also adjust vibration properties of the tube assembly, and not least also to tune one or more of the aforementioned resonance frequencies; this in particular such that, as also indicated in FIG. 3, a first coupling element 23, e.g., a plate-shaped first coupling element, is mechanically connected to each of the tubes and is positioned at a further distance from the flow divider 22 than from the flow divider 21, and that at least one second coupling element 24, e.g., a plate-shaped second coupling element and/or a second coupling element structurally identical to the coupling element 23, is mechanically connected to each of the tubes thereof and is positioned at a further distance from the flow divider 21 than from the flow divider 22. According to a further embodiment of the invention, the tube assembly is furthermore designed such that the resonance frequency f2 of the second-order vibration mode (f2 mode), viz., especially, the second-order flexural vibration mode, nominally deviates from the resonance frequency f1 of the fundamental vibration mode (f1 mode), viz., especially, a first-order flexural vibration mode, viz., in the case of an original or intact transducer, by more than 10% of the resonance frequency f1 and/or by more than 100 Hz.

Figure 6:
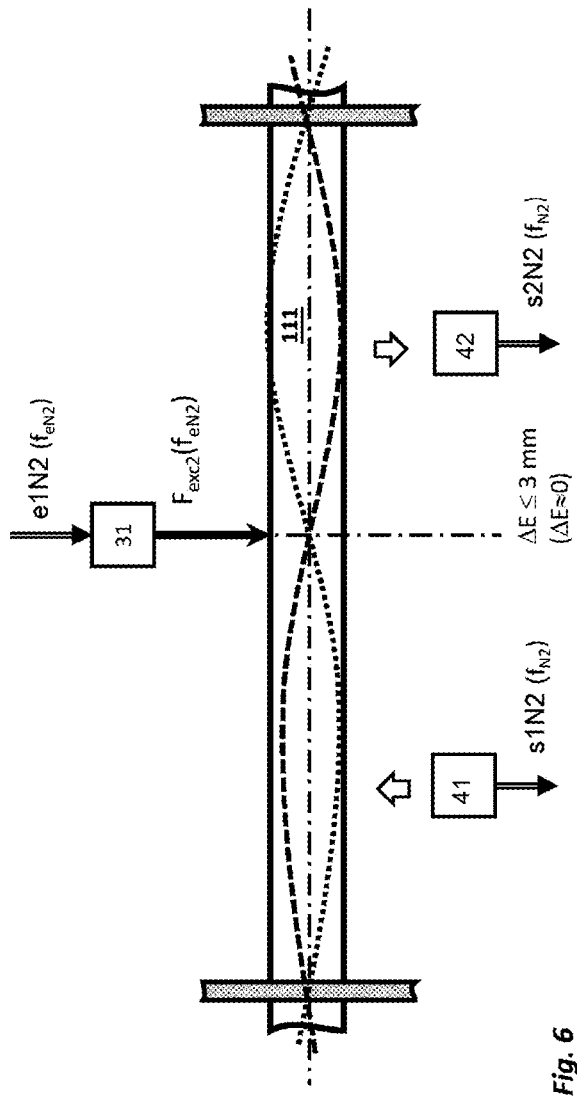
FIGS. 6 and 7 depict views of the tube assembly according to FIG. 4 with the tube assembly excited to second useful vibrations.
Figure 7:
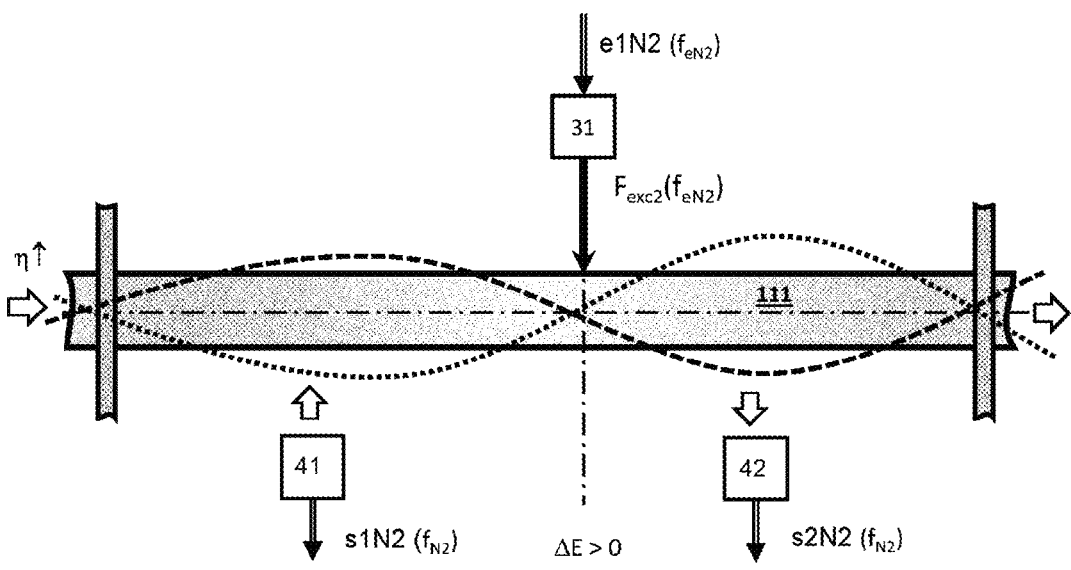
Figure 7:
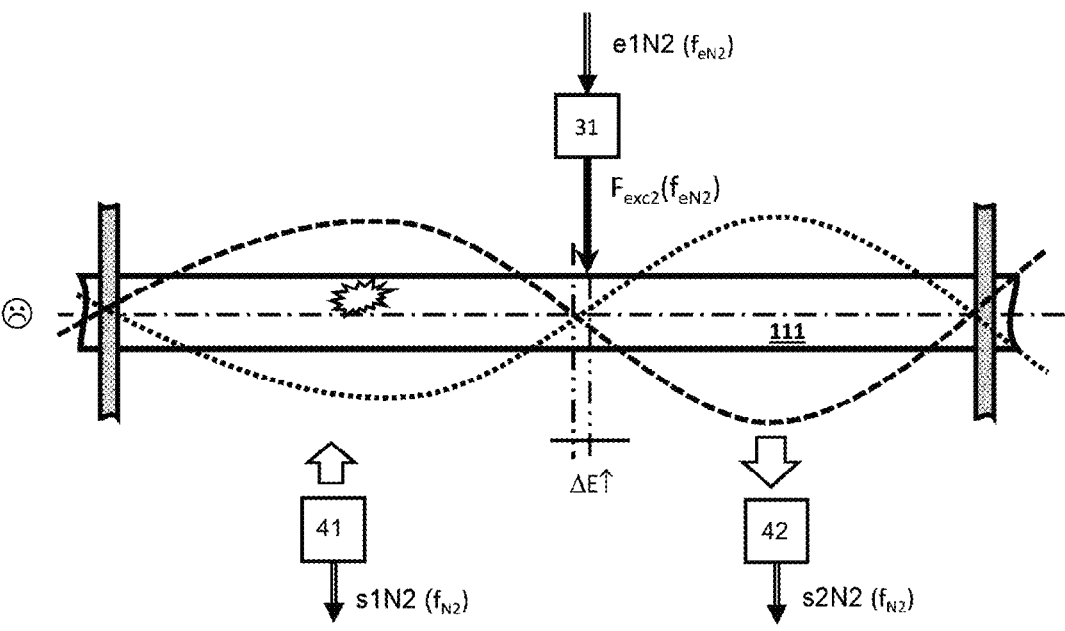

In the measuring system according to the invention, the vibration exciter 31 is positioned and aligned such that, as is also shown schematically in FIG. 4a or 6, and also quite customary in, inter alia, conventional vibronic (standard) measuring systems, a drive offset ΔE, viz., a smallest distance between the aforementioned drive cross-sectional area of the tube 111 and a specified reference cross-sectional area of the at least one tube, is no more than 3 mm and/or less than 0.5% of the tube length, wherein the reference cross-sectional area in turn is selected or defined, viz., for example, is determined with an intact or original transducer, such that a vibration node, which is formed between two vibration antinodes of vibration movements of the at least one tube in a harmonic mode, viz., for example, the second-order vibration mode, and/or is (nominally) located at half the tube length, of said vibration movements is within the reference cross-sectional area. The drive offset ΔE thus virtually also corresponds to a distance between an area centroid (center point) of the drive cross-sectional area of the tube and an area centroid (center point) of the reference cross-sectional area of the at least one tube. The drive offset ΔE may, for example, result from a manufacturing tolerance during the production of the exciter assembly, not least from tolerances in the positioning of the vibration exciter on the at least one tube and/or from tolerances in the positioning of the tube assembly within a transducer protective housing and/or also from a manufacturing tolerance during the production of the tube assembly, not least also the manufacture of the at least one tube. In addition, the drive offset ΔE may also be subject to a change over time, for example due to wear-related asymmetric or non-uniform changes of mechanical properties of the tube assembly. According to a further embodiment of the invention, the reference cross-sectional area of the at least one tube is moreover selected such that a main inertia axis, perpendicular to the aforementioned drive force, of said tube and/or an intersection line of two, mutually-orthogonal symmetry planes of said tube are within the reference cross-sectional area. Moreover, the tube assembly and the exciter assembly according to a further embodiment of the invention are designed such that the drive offset ΔE, at least nominally or initially, and therefore in the intact or original transducer, and as inter alia also quite customary in conventional vibronic (standard) measuring systems, is only slightly greater than zero, namely less than 2 mm, for example, also less than 1 mm, and/or less than 0.2% of the tube length. In the aforementioned case in which the at least one tube is curved at least sectionally, viz., for example, at least sectionally has the shape of a circular arc and/or is substantially V-shaped, the at least one tube 111 may furthermore also be designed, and the aforementioned reference cross-sectional area may be selected, such that exactly one main inertia axis of the at least one tube is within the reference cross-sectional area of said tube. For the other case in which the at least one tube is straight over the entire length of the tube, the aforementioned reference cross-sectional area in turn may be selected such that each of the three main inertia axes of the at least one tube is within the reference cross-sectional area of the at least one tube or that a center of mass is within the reference cross-sectional area of the at least one tube. According to a further embodiment of the invention, the reference cross-sectional area is selected such that a vibration node of said vibration movements that is formed between the two vibration antinodes of the vibration movements of the at least one tube in the aforementioned second-order vibration mode, viz., especially the second-order flexural vibration mode, and/or a main inertia axis of the at least one tube, which is perpendicular to the vibration direction of the vibration movements of the tube in said second-order vibration mode, is within the reference cross-sectional area of the at least one tube.

The measuring system electronics unit 20 of the measuring system according to the invention is furthermore, in particular, configured to, at least intermittently, viz., for example, in normal measuring operation or during a measuring interval, feed in the drive signal e1 with a sinusoidal first (useful) current component eN1 having a first (AC) frequency $f_{eN1}$ and a, for example specified and/or variable, first (current) amplitude, in order to thereby excite, in the aforementioned manner, first useful vibrations, viz., mechanical vibrations of the at least one tube, forced by the vibration exciter (energized with the useful current component eN1) or a first drive force (component) $F_{exc1}$ generated therewith, at a first useful frequency $f_{N1}$, viz., a (vibration) frequency corresponding to the (AC) frequency $f_{eN1}$ ($f_{N1}=f_{eN1}$) and to provide, as a result, the vibration signals s1, s2 respectively with a first useful signal component s1N1, s2N1, viz., respectively a sinusoidal signal component of a (signal) frequency $f_{eN2}$ or $f_{s2N1}$ corresponding to the first useful frequency $f_{N1}$ ($f_{s1N1}=f_{s2N1}=f_{N1}$). Moreover, the measuring system electronics unit 20 of the measuring system according to the invention is also configured to, at least intermittently, feed into the vibration exciter 31 the drive signal e1 with a sinusoidal second (useful) current component eN2 having a second (AC) frequency $f_{eN2}$ and a, for example specified and/or variable, second (current) amplitude, in order to generate second useful vibrations, viz., mechanical vibrations of the tube, forced by the (energized) vibration exciter 31 or a second drive force (component) $F_{exc2}$ generated therewith, at a second useful frequency $f_{eN2}$, viz., a (vibration) frequency corresponding to the (AC) frequency $f_{eN2}$ ($f_{N2}=f_{eN2}$), for example, also simultaneously with the (useful) current component eN1, in order to thereby excite second useful vibrations, viz., mechanical vibrations of the at least one tube, forced by the vibration exciter (energized with the (useful) current component eN2) or a second drive force (component) $F_{exc2}$ generated therewith, at a second useful frequency $f_{N2}$, viz., a (vibration) frequency corresponding to the (AC) frequency $f_{eN1}$ ($f_{N1}=f_{eN1}$) and to provide, as a result, the vibration signals s1, s2 respectively with a second useful signal component s1N2, s2N2, viz., respectively a sinusoidal signal component of a (signal) frequency $f_{s1N2}$ or $f_{s2N2}$ corresponding to the second useful frequency $f_{N2}$ ($f_{s1N2}=f_{s2N2}=f_{N2}$). In order to generate the drive signal e1, the measuring system electronics unit 20, as is quite customary in such measuring systems, can have a corresponding driver circuit Exc, formed, for example, by means of one or more phase locked loops (PLL) used to determine a respective resonance frequency or to adjust the currently required (AC) frequency. Moreover, the measuring system electronics unit 20 may furthermore be configured to adjust a capture range of a phase-locked loop (PLL2) adjusting the second (AC) frequency, on the basis of the first (AC) frequency $f_{eN1}$ or by means of at least one output signal of a phase-locked loop (PLL1) adjusting said (AC) frequency $f_{eN1}$, few, viz., for example, an output signal of a loop filter of said phase-locked loop (PLL1). Furthermore, the measuring system electronics unit 20 can advantageously also be configured to, at least intermittently, simultaneously feed the first and second (usable) current components into the vibration exciter 31, for example for a time interval that lasts not less than two vibration periods of the first (useful) current component and/or more than 10 ms (milliseconds); this, for example, in such a way that the measuring system electronics unit (20) is configured to switch on the (useful) current component e1N2 during the feeding of the (useful) current component eN1 or to switch off the (useful) current component e1N2 again after a time interval that lasts not less than two vibration periods of the (useful) current component e1N1 and/or more than 1 s, and/or also in such a way that the first (current) amplitude of the (useful) current component e1N1 is not adjusted to be smaller than the second (current) amplitude of the (useful) current component e1N2 and/or that the second (current) amplitude is adjusted, at least intermittently, to be more than 40%, for example not less than 50%, of the first (current) amplitude.

The measuring system electronics unit 20 of the measuring system according to the invention is furthermore configured to adjust the (AC) frequencies $f_{eN1}$, $f_{eN2}$ such that the (AC) frequencies $f_{eN1}$ deviate from a resonance frequency $f_{2n+1}$ (n=0; 1; 2; . . . →f1; f3; . . . ) of a symmetric vibration mode, and therefore an odd-order vibration mode, viz., especially, the aforementioned fundamental vibration mode (f1 mode), by less than 1% of said resonance frequency $f_{2n+1}$ and/or by less than 1 Hz, and that the (AC) frequencies $f_{eN2}$ deviate from a resonance frequency $f_{2n+2}$ (n=0; 1; 2; . . . →f2; f4; . . . ) of an antisymmetric vibration mode, and therefore an even-order vibration mode, viz., especially, the aforementioned second-order vibration mode (f2 mode), by less than 1% of said resonance frequency $f_{2n+2}$ (f2; f4) and/or by less than 1 Hz; this, for example, in such a way that the (AC) frequency $f_{eN1}$ of the resonance frequency $f_{2n+1}$ of the excited odd-order vibration mode and/or the (AC) frequency $f_{eN2}$ of the resonance frequency $f_{2n+2}$ of the excited even-order vibration mode match, and/or in such a way that the first useful vibrations are suitable for causing Coriolis forces $F_c$ in a measured substance flowing through the at least one tube with a non-zero mass flow and the useful signal component s1N1, s2N1 each have a phase angle dependent on the mass flow or follow a change in the mass flow with a change in a (measurement) phase difference $\Delta\varphi 12$, viz., a change in a difference between the phase angle of the useful signal component s1N1 and a phase angle of the useful signal component s2N1, and/or such that the drive signal e1, and therefore the vibration signals s1, s2, respectively follow a change in a density of the measured substance conducted in the tube assembly with a change in the (AC) frequency $f_{eN1}$, $f_{eN2}$ of at least one of the useful current components eN1, eN2, or the (signal) frequency of the respective useful signal components. The aforementioned resonance frequency $f_{2n+1}$, and therefore the (AC) frequency $f_{eN1}$, corresponds to an associated first modal damping D1, viz., a damping of the (excited) odd-order vibration mode or the first useful vibrations or depends thereon, and the resonance frequency $f_{2n+2}$, and therefore the (AC) frequency $f_{eN2}$, corresponds to an associated second modal damping D2, viz., a damping of the (excited) even-order vibration mode or the second useful vibrations or depends thereon. The (AC) frequency $f_{eN1}$ of the useful current components eN1, and therefore the first useful frequency $f_{N1}$, can, for example, correspond to a resonance frequency of the tube assembly, which measurably also depends on the density of the measured substance FL conducted in the tube assembly, viz., for example, a lowest resonance frequency of the tube 111 or the resonance frequency f1 of the fundamental vibration mode (f1 mode), and the aforementioned (AC) frequency $f_{eN2}$ of the useful current components eN2, and therefore the second useful frequency $f_{N2}$ can, for example, correspond to the resonance frequency f2 of the second-order vibration mode (f2 mode). Accordingly, the measuring system electronics unit 20 according to a further embodiment of the invention is furthermore configured to adjust the (AC) frequency $f_{eN1}$ such that said (AC) frequency or the useful frequency $f_{N1}$ deviates from the resonance frequency f1 of the fundamental vibration mode by less than 1% of said resonance frequency f1($|f1-f_{N1}|$<0.01 f1) and/or by less than 1 Hz ($|f1-f_{N1}|$<1 Hz) or corresponds to the resonance frequency f1 of the fundamental vibration mode (f1 mode), and that the vibration movements of the first useful vibrations ultimately correspond to those of the fundamental vibration mode (f1 mode) of the at least one tube 111.

Alternatively, the measuring system electronics unit may, for example, also be configured to adjust the first (AC) frequency $f_{eN1}$ such that said (AC) frequency $f_{eN1}$ or the useful frequency $f_{N1}$ deviates from a resonance frequency f3 of the third-order vibration mode (f3 mode) by less than 1% of said resonance frequency f3 ($|f3-f_{N1}|$<0.01 f3) and/or by less than 1 Hz ($|f3-f_{N1}|$<1 Hz), viz., for example, corresponds to the resonance frequency f3 of the third-order vibration mode (f3 mode), and that the vibration movements of the first useful vibrations thus ultimately correspond to those of the third-order vibration mode (f3 mode) of the at least one tube 111. According to a further embodiment of the invention, the measuring system electronics unit 20 is moreover configured to adjust the (AC) frequency $f_{eN2}$ such that said (AC) frequency $f_{eN2}$ or the useful frequency $f_{N2}$ deviates from the resonance frequency f2 of the second-order vibration mode (f2 mode) by less than 1% of said resonance frequency f2 ($|f2-f_{N1}|$<0.01 f1) and/or by less than 1 Hz ($|f2-f_{N2}|$<1 Hz) or corresponds to said resonance frequency f2, and that the vibration movements of the second useful vibrations thus ultimately correspond to those of the second-order vibration mode (f2 mode) of the at least one tube 111.

The aforementioned (system) parameters, especially, the resonance frequencies ($f_{2n+1}$, $f_{2n+2}$), as well as the respectively associated (modal) dampings, can easily be determined directly by means of the measuring system electronics unit 20 during operation, viz., for example, calculated on the basis of the vibration signals s1, s2 and/or the drive signal e1, and can be provided for further calculations, which are, for example, to be carried out in the measuring system electronics, in the form of corresponding digital measurement data. Accordingly, the measuring system electronics unit according to a further embodiment of the invention is furthermore configured, for example also for the purpose of determining viscosity measured values X$\eta$ representing the viscosity of the measured substance, and/or density measured values X$\rho$ representing the density of the measured substance, to determine, based on the first useful signal component (s1N1; s2N1) of at least one of the vibration signals (s1, s2) and/or the (useful) current component eN1 of the drive signal e1, at least one, for example digital, first quality value XD1 and, based on the second useful signal component (s1N2; s2N2) of at least one of the vibration signals s1, s2 and/or the (useful) current component eN2 of the drive signal e1, at least one, for example digital, second quality value XD2, in such a way that the quality value XD1 depends on the (modal) damping D1 and the quality value XD2 depends on the (modal) damping D2, or that the quality value XD1 represents, viz., especially, quantifies, a measure of the modal damping D1, viz., for example, a quality (1/D1) of the first useful vibrations or a damping ratio of the first useful vibrations, and the quality value XD2 represents, viz., especially, quantifies, a measure of the (modal) damping D2, viz., for example, a quality (1/D2) of the second useful vibrations or a damping ratio of the second useful vibrations. As is known, the (modal) qualities or dampings can easily be determined during operation of the measuring system on the basis of a speed of the respective (modal) vibration movements and a useful current component of the drive signal e1 respectively driving them, and can, for example, be represented in the form of corresponding digital measured values. For this purpose, the measuring system electronics unit 20 can furthermore advantageously be configured to determine, on the basis of at least one of the vibration signals (s1, s2), a (digital) first speed value, which represents a first vibration speed, viz., a speed of the vibration movements of the at least one tube carrying out the first useful vibrations, at least one (digital) second speed value, which represents a second vibration speed, viz., a speed of the vibration movements of the at least one tube carrying out the second useful vibrations, to store at least one (digital) first current measured value representing the (useful) current component eN1, especially, a (current) amplitude of the (useful) current component eN1 or an effective value of the (useful) current component eN1, and/or at least one (digital) second current measured value representing the (useful) current component eN2, for example, an amplitude of the (useful) current component eN2 or an effective value of the (useful) current component eN2, viz., for example, also in the aforementioned non-volatile data memory EEPROM. In addition, the measuring system electronics unit may moreover also be configured to determine, on the basis of at least one of the vibration signals (s1, s2) and/or on the basis of the drive signal e1, at least one (digital) first frequency measured value $X_{f1}$ representing the useful frequency fN1 or the resonance frequency f1, and at least one (digital) second frequency measured value $X_{f2}$ representing the useful frequency fN2 or the resonance frequency f2, and to store them accordingly for further calculations in the measuring system electronics unit, for example also to store them in the data memory EEPROM; this, for example, also in order to calculate, on the basis of such frequency values, density measured values $X_{\rho}$ representing the density, for example according to a corresponding resonance-frequency-to-density-measured value characteristic curve function of the measuring system electronics unit. Alternatively or additionally, the measuring system electronics unit 20 may also be provided or configured to generate, on the basis of at least one of the vibration signals s1, s2, and/or the drive signal e1, for example, also based on the aforementioned first and/or second quality values (XD1, XD2), viscosity measured values X$\eta$, viz., measured values representing the viscosity $\eta$ of the measured substance FL, for example, according to a damping(s)-to-viscosity-measured-value characteristic curve function of the measuring system electronics unit. The processing of the vibration signals s1, s2, and possibly also a control of the aforementioned driver circuit(s) Exc, which is quite customary in such measuring systems, may also take place, as is also respectively shown schematically in FIG. 2 or 3, for example, also by means of the aforementioned measurement and evaluation circuit DSV. In order to further improve the accuracy with which the measured values $X_M$ are ultimately determined, the transducer can, as also respectively shown schematically in FIGS. 2 and 3 and as quite customary in such measuring systems, furthermore also have temperature sensors 71 (71, 72) used to detect temperatures within the tube assembly and to provide one or more corresponding temperature measurement signals $\theta1$ ($\theta1$, $\theta2$), and respectively attached, for example, directly to the at least one tube of the tube assembly, and/or strain sensors used to detect mechanical stresses within the tube assembly and to provide one or more corresponding strain measurement signals, and respectively attached, for example, directly to one of the tubes of the tube assembly, and the measuring system electronics unit can furthermore be configured to receive and process the temperature or strain measurement signals, viz., especially to also use them in the determination of the measured values.

As already indicated, the measuring system electronics unit 20 is furthermore, inter alia, also provided or designed to receive and evaluate the vibration signals s1, s2 generated by means of the transducer 10, viz., especially, to determine and output measured values $X_M$ representing the at least one measured variable, wherein, as already mentioned, the first useful signal components s1N1, s2N1 of the vibration signals s1, s2 may also respectively have additional (interference) phase angles, not least due to the aforementioned drive offset ΔE; this, in particular, such that, in addition to the respective (measurement) phase difference Δφ12, there also exists, between the useful signal components s1N1, s2N1, an (interference) phase difference of equal frequency that is dependent on one or more substance parameters of the measured substance, especially, also the viscosity of the measured substance respectively co-determining the afore-mentioned modal dampings (D1, D2), and is nevertheless independent of the mass flow, and the vibration signals s1, s2 therefore have a non-vanishing systematic phase error or also zero-point error that corresponds to the phase difference between the useful signal components of the two vibration signals in the case of a mass flow of zero. In order to minimize the aforementioned phase error, not least also dependent on the first and second (modal) dampings (D1, D2), or the resulting (interference) phase difference, the measuring system electronics unit of the measuring system according to the invention is therefore in particular also configured to determine, on the basis of both the first (useful) current component eN1 and/or the first useful signal components s1N1, s2N1, viz., for example, on the basis of the (signal) frequency thereof and/or on the basis of an amplitude of at least one of the useful signal components s1N1, s2N1 and/or on the basis of a phase angle of at least one of the useful signal components s1N1 or s2N1, and the second (useful) current component eN2 and/or at least one of the second useful signal components s1N2, s2N2, mea-sured values representing the at least one flow parameter of the measured substance, viz., for example, to determine, on the basis of the aforementioned (measurement) phase dif-ference Δφ12 of the first useful signal components s1N1, s2N1 and on the basis of both an amplitude of at least one of the first useful signal components s1N1, s2N1 and an amplitude of at least one of the second useful signal com-ponents s1N2, s2N2 and/or on the basis of the first and second useful current components (e1N1, e1N2), viz., espe-cially, on the basis of the first and second current amplitudes, mass-flow measured values $X_m$ representing the mass flow of the measured substance. For this purpose, in the measur-ing system electronics unit according to a further embodi-ment of the invention, at least one phase-difference-to-measured-value characteristic curve function, especially, a phase-difference-to-mass-flow-measured-value characteris-tic curve function $(X_m=f\{\Delta\varphi12, D1, D2\})$, is configured, viz., for example, programmed, according to which the measuring system electronics unit can determine or deter-mines, on the basis of the measurement phase difference Δφ12, which is possibly, not least in the case of electrody-namic vibration sensors, also normalized to the useful fre-quency fN1 (Δφ12~fN1·Δφ12*), measured values $X_M$ rep-resenting the at least one flow parameter of the measured substance, viz., especially, mass-flow measured values $X_m$ representing the mass flow of the measured substance, wherein the aforementioned first and second modal dampings (D1, D2) are taken into account in the at least one phase-difference-to-(mass-flow)-measured-value character-istic curve function; this, for example, in such a way that a product of a second power $D1^2$ of the first modal damping D1 and a reciprocal 1/D2 of the second modal damping D2 is taken into account in the phase-difference-to-(mass-flow)-measured-value characteristic curve function, and/or in such a way that the phase-difference-to-mass-flow-measured-value characteristic curve function corresponds to a calcu-lation rule:

$$Xm = k11 \cdot \frac{\Delta\varphi12}{2\pi \cdot fN1} - k12 - k2\frac{D1^2}{D2} = k11 \cdot \Delta\varphi12^* - k12 - k2\frac{D1^2}{D2}$$

or mass-flow measured values $X_m$ determined by means of the measuring system electronics unit fulfill the aforemen-tioned calculation rule. Each of the first and second modal dampings, like the (mass-flow) measured values, can easily be recurrently determined during operation, possibly also in real time, viz., especially be calculated numerically or measured digitally, by means of the measuring system electronics unit on the basis of the respective first or second current amplitude and on the basis of at least one of the first or second useful signal components. The coefficients k11, k12 and k2 of the calculation rule are respectively measuring system-specific (calibration) constants which can be deter-mined for the respective measuring system in advance, for example on the basis of computer-based (simulation) cal-culations and/or on the basis of laboratory measurements carried out on a few samples of a measuring-system series, and/or by individual calibration of the respective measuring system under reference conditions, viz., for example, in the course of a (wet) calibration of the respective measuring system at the manufacturer and/or a (re)calibration of the measuring system on site. The coefficient k11, which, espe-cially, is also implemented in conventional vibronic mea-suring systems, corresponds to a change, related to a change of the (reference) mass flow of a calibration fluid conducted in the transducer, for example, water having a temperature of 25° C., in the phase difference of the first useful signal components (s1N1, s2N1) slope of the characteristic curve function of the aforementioned phase-difference-to-mass-flow-measured-value characteristic curve function or a (measurement) sensitivity of the measuring system, and the coefficient k12, which is, especially, also implemented in conventional vibronic measuring systems, corresponds to a (scale) zero point, for example, a static zero point, viz., a calibration constant corresponding to a (measurement) phase difference that is determined with a zero (reference) mass flow of the calibration fluid, or a dynamic zero point. The coefficients k11, k12 can also be selected, for example, such that mass-flow measured values Xm* respectively provisionally determined for a reference mass flow solely with a shortened calculation rule:

$$Xm^* = k11 \cdot \frac{\Delta\varphi12}{2\pi \cdot fN1} - k12$$

respectively have a measurement deviation of already less than 0.2% of the reference mass flow and/or less than 0.05 kg/h. Air, oil, and/or alcohol, e.g., glycerol, can, for example, also be used, as an alternative or in addition to water, as one of a plurality of calibration fluids. In a corresponding manner, the measuring system electronics unit 20 may also, especially, be configured to initially determine, during operation, on the basis of the measurement phase difference $\Delta\varphi12$ (or the normalized measurement phase difference $\Delta\varphi12^*$), nevertheless without taking into account the second useful vibrations or the second (useful) signal components, provisional mass-flow measured values Xm* and, thereafter, to correspondingly calculate the respective mass-flow measured values Xm* with the currently determined first and second modal dampings (D1, D2), for example, based on a correspondingly modified calculation rule:

$$Xm = X_m^* - k2\frac{D1^2}{D2}.$$

The aforementioned provisional mass-flow measured values Xm* may also, for example, correspond to the mass-flow measured values calculated in a conventional manner, viz., in a manner typical of the conventional measuring systems of the type in question, not least also measuring systems known from the aforementioned US-A 2006/0266129, 2007/0113678, US-A 2010/0011882, 2012/0123705, 2017/0356777, U.S. Pat. Nos. 5,602,345, 5,926, 096, 6,311,136, WO-A 2009/136943, WO-A 2019/017891, WO-A 2019/081169, WO-A 2019/081170, WO-A 87/06691, WO-A 96/05484, WO-A 96/08697, WO-A 97/26508 or WO-A 99/39164, or can accordingly also easily be determined based on the phase-difference-to-mass-flow-measured-value characteristic curve function already implemented in conventional measuring systems.

According to a further embodiment of the invention, the measuring system electronics unit 20 is furthermore configured to determine, based on both the first (useful) current component eN1 and/or the first useful signal components s1N1, s2N1, viz., for example, on the basis of the (signal) frequency thereof and/or on the basis of an amplitude of at least one of the useful signal components s1N1, s2N1, and the second (useful) current component eN2 and/or at least one of the second useful signal components s1N2, s2N2, viz., for example, on the basis of the (signal) frequency thereof and/or on the basis of an amplitude of at least one of the useful signal components s1N2, s2N2, at least one (damping) correction value D12, which is used, for example, to take into account the contributions of the first and second modal dampings (D1, D2) to the at least one provisional mass-flow measured value $X^*_m$ and/or is digital, for the (measurement) phase difference $\Delta\varphi12$ or for provisional mass-flow measured values (Xm*) determined therewith, in such a way that the (damping) correction value $\Delta$D12 corresponds to the first and second modal dampings (D1, D2) or is a function of the first and second modal dampings (D1, D2), and the first and second modal dampings (D1, d2) are therefore taken into account in the (damping) correction value $\Delta$D12; this, especially, such that an amount of the (damping) correction value increases with increasing modal damping D1 and/or decreases with increasing modal damping D2 and/or the (damping) correction value $\Delta$D12 contains a product from a second power of the reciprocal of a quality (1/D1) of the first useful vibrations and a quality (1/D2) of the second useful vibrations, and/or also in such a way that the at least one (damping) correction value $\Delta$D12 is proportional to a ratio (D1²/D2) or fulfills a calculation rule:

$$\Delta D12 = k2 \cdot \frac{D1^2}{D2}$$

and/or in such a way that the at least one mass-flow measured value $X_m$ fulfills a calculation rule:

$$Xm = k11 \cdot \frac{\Delta\varphi12}{2\pi \cdot fN1} - k12 - \Delta D12.$$

Moreover, it has surprisingly been found that the coefficient k2 contained in the aforementioned calculation rules for calculating the mass-flow measured value Xm or the (damping) correction value $\Delta$D12 can advantageously also be designed as a transducer type-specific or measuring-system series-specific calibration constant, for example, in such a way that the coefficient k2 can be determined in advance on the basis of laboratory measurements carried out by means of one or a few samples of a transducer type or a measuring-system series, and is correspondingly used again in further measuring systems, which are each formed by means of a transducer of the same type or which belong to the same (measuring-system) series, or is contained in the respective phase-difference-to-mass-flow-measured-value characteristic curve function of said measuring system. The (damping) correction value $\Delta$D12 can, for example, also be calculated in the measuring system electronics unit 20 based on the aforementioned quality values XD1, XD2, for example, in such a way that the (damping) correction value $\Delta$D12 is formed by means of a product of the quality value XD2 and a second power of the reciprocal of the quality value XD1 ($\Delta$D12~1/XD1² XD2). Alternatively or additionally, the (damping) correction value $\Delta$D12 can, however, also be determined as a function of the second vibration speed, a second power of the (current) amplitude of the (useful) current component eN1, a reciprocal of the (current) amplitude of the (useful) current component eN2, and a reciprocal of a second power of the first vibration speed, for example, by using the aforementioned first and second speed values and the aforementioned first and second current measured values.

According to a further embodiment, the measuring system electronics unit is moreover configured to store the at least one (damping) correction value $\Delta$D12 or also a plurality of temporally sequentially determined (damping) correction values, viz., for example, in the aforementioned non-volatile data memory EEPROM and/or in such a way that at least one initially determined (damping) correction value is stored as a measuring system-specific reference value. In that the first and second modal dampings (D1, D2) or the (damping) correction value $\Delta$D12 respectively correspond to the aforementioned drive offset $\Delta$E or depend thereon, the first and second modal dampings (D1, D2) or the (damping) correction value $\Delta$D12 can respectively also be used as a measure of the drive offset $\Delta$E or to calculate the drive offset $\Delta$E. For example, the (damping) correction value $\Delta$D12 can be determined, initially or in advance, e.g., by the manufacturer of the measuring system, under the aforementioned reference conditions by means of a calibration fluid and can be stored in the measuring system electronics unit 20, e.g., in the aforementioned non-volatile data memory (EEPROM), in order to be used later, for example, during a start-up of the measuring system and/or during (re)calibration of the measuring system, as a reference value representing an intact measuring system, which reference value can respectively be compared to one or more (damping) correction values currently correspondingly determined by means of a calibration fluid. Any changes in the transducer, which may, inter alia, also result in a change in the drive offset $\Delta$E, for example due to overloads, such as high (excess) temperatures or temperature shocks, excessively high pressures or pressure surges in the measured substance, excessively high clamping forces and/or excessively strong vibration forces exerted on the transducer on the part of the process line, properties, damaging to the at least one tube, especially, corrosive or abrasive properties, of the measured substance conducted in the transducer, or also due to material fatigue can thus be detected early in the course of a (self-) diagnosis carried out on the measuring system in a time-controlled manner and/or upon request, and can possibly be correspondingly reported by the measuring system electronics unit 20 itself, for example, to the aforementioned (measurement) data processing system and/or on site in the form of a system status or fault message declared as an alarm. Accordingly, the measuring system electronics unit 20 according to a further embodiment of the invention, is furthermore configured to carry out, based on the vibration signals s1, s2 and/or the drive signal e1, viz., for example, on the basis of at least one first useful signal component (s1N1, s2N1) and at least one second useful signal component (s1N2, s2N2) and/or on the basis of the first and second (useful) current components (eN1, eN2) or by using the (damping) correction value $\Delta$D12, a (self-) diagnosis of the measuring system, for example also on site with the transducer integrated in the aforementioned process line, viz., at a measuring point formed by means of the transducer or by means of the measuring system, and/or immediately after the insertion of the transducer into the transducer protective housing, which is possibly also already connected mechanically to the line system. The aforementioned (self-)diagnosis can, for example, be performed during the start-up of the measuring system or the measuring point formed therewith, in the course of a (re)calibration and/or intermittently during (normal) measuring operation. Thus, a (modal) damping D2 which increases too fast and/or continuously over time, with at the same time a substantially constant or also decreasing (modal) damping D1 and/or a temporally greatly changing, e.g., continuously increasing or continuously decreasing, ratio D1/D2 (D1/D2~XD2/XD1=$\Delta$D12/XD1) of the first and second (modal) dampings (D1, D2) or of the (damping) correction value $\Delta$D12 with at the same time substantially constant substance parameters of the measured substance (density $\rho$, viscosity $\eta$, pressure, temperature, . . . ) can, for example, be used as an indicator for the presence of a fault of the transducer, and/or a greatly fluctuating or significantly scattering (damping) correction value $\Delta$D12 can be used as an indicator for the presence of a fault caused by the measured substance itself, for example by foreign substances or bubbles entrained in the measured substance. The (parameter) measured values determined for one or more of the aforementioned (system) parameters, viz., especially, the resonance frequencies ($f_{2n+1}, f_{2n+2}$) of the at least one tube and the associated (modal) dampings, viz., for example, the quality values (XD1, XD2) representing the (modal) dampings (D1, D2), or the (damping) correction values $\Delta$D12 can furthermore also be used to recurrently determine a scatter measure for the respective (system) parameter. Such a scatter measure can, for example, be an empirical variance or a span for the respective (system) parameter or the respectively determined first and second quality values, and/or the (damping) correction values $\Delta$D12. The determined scatter measure can likewise be used for the (self-) diagnosis, e.g., in such a way that a (mechanical) fault of the transducer is at most inferred if the respective (system) parameter has a low scatter measure, viz., a scatter measure below a correspondingly specified threshold value, and/or that a (system) parameter having a scatter measure above a correspondingly specified threshold value does not trigger any such fault notification, even if a comparison of its parameter values to the respective reference value would initially indicate this. Moreover, a (system) parameter having a scatter measure above a correspondingly specified threshold value can be used as an indicator for strongly fluctuating substance parameters, e.g., as a result of foreign substances and/or bubbles in the measured substance. The scatter measure determined respectively with the measuring system electronics unit 20 can possibly, moreover, also be output, e.g., displayed on-site, and/or passed to the aforementioned (measurement) data processing system. Alternatively or additionally, the parameter values determined for one or more of the aforementioned (system) parameters can furthermore also be used to recurrently determine a change over time, viz., for example, a change trend and/or a rate of change and/or a change rate of the respective (system) parameter. The determined temporal change can likewise be used for the (self-)diagnosis, for example, in such a way that, in the case of decreasing damping D2 or in the case of a change in the (damping) correction values $\Delta$D12 that increases at a rate of change within a specified measuring range, an increasing fault of the transducer is determined, and/or a message representing an increase in a fault, especially, a message declared as a (fault) alarm, is output. The temporal change or change rate or change velocity respectively determined with the measuring system electronics unit 20 can moreover also be output, e.g., displayed on-site, and/or passed to the aforementioned (measurement) data processing system. Accordingly, the measuring system electronics unit 20 can furthermore be designed to compare at least one currently determined (damping) correction value $\Delta$D12 and/or at least one parameter value representing a current rate of change ($\Delta/\Delta t$) or change rate (d/dt) of the (damping) correction value $\Delta$D12, and/or at least one parameter value representing a current (temporal) scattering of the (damping) correction value $\Delta$D12 to one or more threshold values which are respectively specified for this purpose, for example calculated on the basis of one or more initially determined (damping) correction values, at least one of said threshold values representing an out-of-spec transducer and/or an impermissibly large drive offset $\Delta$E. Alternatively or additionally, the measuring system electronics 20 can also be configured to determine, at least qualitatively, by means of at least one of the vibration signals s1, s2 and/or the drive signal e1, viz., for example, also by using the (damping) correction value $\underline{\Delta D12}$, an extent of drive offset $\Delta$E and/or to perform a check of the measuring system, for example also in the course of a self-diagnosis on site.

The aforementioned (self-)diagnosis of the measuring system can, for example, be carried out during a test interval correspondingly reserved for this purpose, e.g., also an occasionally repeated test interval, or a test interval respectively lasting more than 10 ms (milliseconds), advantageously more than 100 ms, and especially not less than 1 s (second). The test interval can be time-limited, e.g., to respectively less than 1 min, be started nevertheless recurrently, e.g., by a command from outside the measuring system and/or in an automated manner, viz., in a time-controlled and/or event-controlled manner by the measuring system electronics unit itself. For example, the measuring system electronics unit can be configured to start the test interval in the case of a measured substance FL detected as flowing in a stationary manner and/or to end it in the case of a measured substance FL detected as flowing in a non-stationary manner or in the case of rapidly changing measuring conditions and/or rapidly changing measured variables. Accordingly, the measuring system electronics unit according to a further embodiment of the invention is to automatically start and/or end the test interval and/or is to be able to receive and execute one or more commands that start the test interval. According to a further embodiment of the invention, the measuring system electronics unit is furthermore configured to start the test interval during the normal measuring operation or during the excitation of the first useful vibrations in such a way that at least the drive signal e1 with the second (useful) current component eN2 is provided; this, for example, also in such a way that the drive signal e1 simultaneously also contains, at least intermittently, the first (useful) current component eN1, so that the second useful vibrations are simultaneously excited with the first useful vibrations, and the first and second useful vibrations are therefore at least intermittently superposed on one another during the test interval.

The invention claimed is:

1. A vibronic measuring system configured to measure at least one flow parameter of a flowing fluid measured substance, the measuring system comprising:

a transducer including:

a tube assembly configured to conduct the flowing measured substance, the tube assembly including at least one tube, which:

defines a lumen enclosed by a tube wall and extends from a first tube end to a second tube end with a tube length; and is configured to be flowed through by the measured substance in a flow direction from the first tube end to the second tube end while enabled to vibrate;

an exciter assembly configured to convert electrical power into mechanical power as to excite and maintain forced mechanical vibrations of the tube assembly; and a sensor assembly configured to detect mechanical vibrations of the tube assembly and to generate vibration signals respectively representing vibration movements of the tube assembly; and an electronics unit electrically connected to the exciter assembly and to the sensor assembly, the electronics unit configured to at least intermittently feed an electrical drive signal into the exciter assembly, wherein inherent in the tube assembly is a plurality of vibration modes respectively having an associated modal damping and an associated resonance frequency determined thereby, in which vibration modes the at least one tube performs damped vibration movements respectively having one or more vibration antinodes and two or more vibration nodes, such that:

vibration movements of the at least one tube in a fundamental vibration mode, which is a first-order flexural vibration mode, have exactly one vibration antinode and two vibration nodes, and vibration movements of the at least one tube in a harmonic mode, which is a second-order or higher-order flexural vibration mode, have two or more vibration antinodes and three or more vibration nodes, wherein the exciter assembly includes a vibration exciter, which is mechanically connected to the at least one tube and is configured to convert electrical power with a temporally-variable electrical current into mechanical power such that, at a drive point of the vibration exciter on the at least one tube mechanically connected thereto, a temporally-variable drive force acts on the at least one tube, and the at least one vibration exciter is positioned and aligned such that a drive offset, which is a smallest distance between a drive cross-sectional area of the tube enclosed by an imaginary circumferential line of the tube passing through the drive point and a specified reference cross-sectional area of the at least one tube, is not more than 3 mm and/or less than 0.5% of the tube length, wherein a vibration node of vibration movements of the at least one tube in a second-order or higher-order vibration mode, which vibration node is formed between two vibration antinodes of said vibration movements of the at least one tube in said second-order or higher-order vibration mode, is within the reference cross-sectional area, wherein the sensor assembly includes a first vibration sensor, which is positioned on the at least one tube at a distance from the vibration exciter in the flow direction and is configured to detect vibration movements of the at least one tube and convert the vibration movements into a first vibration signal representing said vibration movements, and wherein the sensor assembly includes a second vibration sensor, which is positioned on the at least one tube at a distance from the vibration exciter in the flow direction and is configured to detect vibration movements of the at least one tube and convert them into a second vibration signal representing the vibration movements, wherein the electronics unit is configured to feed the electrical drive signal to the vibration exciter, at least intermittently, with a sinusoidal first current component having a first frequency and a first amplitude as to excite first used vibrations, which are mechanical vibrations of the at least one tube forced by the vibration exciter and having a first used frequency, which is a vibration frequency corresponding to the first frequency, such that:

the first frequency deviates from a resonance frequency of an odd-order vibration mode by less than 1% of the resonance frequency and/or by less than 1 Hz wherein the resonance frequency of said odd-order vibration mode corresponds to or depends on an associated first modal damping of the odd-order vibration mode; and the first or second vibration signals generated by the first and second vibration sensors each include a first signal component, which is a sinusoidal signal component having a frequency corresponding to the first used frequency, and wherein the electronics unit is configured to feed the electrical drive signal to the vibration exciter, at least intermittently, with a sinusoidal second current component having a second frequency and a second amplitude to generate second used vibrations, which are mechanical vibrations of the at least one tube forced by the vibration exciter and having a second used frequency, which is a frequency corresponding to the second frequency, such that:

the second frequency deviates from a resonance frequency of an even-order vibration mode by less than 1% of said resonance frequency and/or by less than 1 Hz wherein the resonance frequency of said even-order vibration mode corresponds to or depends on an associated second modal damping of the even-order vibration mode; and the first or second vibration signals generated by the first and second vibration sensors each include a second signal component, which is a sinusoidal signal component having a frequency corresponding to the second used frequency, and wherein the electronics unit is configured to determine, both based on a difference between a phase angle of the first signal component of the first vibration signal and a phase angle of the first signal component of the second vibration signal and based on at least one of the second signal components and/or of the second current component, measured values representing the at least one flow parameter of the measured substance.

2. The measuring system according to claim 1, wherein the first used frequency deviates from a resonance frequency of the fundamental vibration mode, which is a first-order flexural vibration mode, by less than 1% of said resonance frequency and/or by less than 1 Hz.

3. The measuring system according to claim 1, wherein the first used frequency deviates from a resonance frequency of a third-order vibration mode inherent in the at least one tube, which is a third-order flexural vibration mode, in which vibration mode the vibration movements of the at least one tube have exactly three vibration antinodes and four vibration nodes, by less than 1% of said resonance frequency and/or by less than 1 Hz, or wherein the first used frequency corresponds to said resonance frequency.

4. The measuring system according to claim 3, wherein a first vibration node of vibration movements of the at least one tube in the third-order vibration mode is located in the first tube end, and a second vibration node of vibration movements of the at least one tube in the third-order vibration mode is located in the second tube end.

5. The measuring system according to claim 1, wherein the second used frequency deviates from a resonance frequency of a second-order vibration mode inherent in the at least one tube, which is a second-order flexural vibration mode, in which vibration mode the vibration movements of the tube have exactly two vibration antinodes and three vibration nodes, by less than 1% of said resonance frequency and/or by less than 1 Hz, or wherein the second used frequency corresponds to said resonance frequency.

6. The measuring system according to claim 5, wherein:

a first vibration node of vibration movements of the at least one tube in the second-order vibration mode is located in the first tube end and a second vibration node of vibration movements of the at least one tube in the second-order vibration mode is located in the second tube end; and/or a vibration node formed between two vibration antinodes of the vibration movements of the at least one tube in the second-order vibration mode, said vibration node located at half the tube length, of said vibration movements is within the reference cross-sectional area; and/or a main inertia axis of the at least one tube is within the reference cross-sectional area of the at least one tube, wherein the main inertia axis is perpendicular to the vibration direction of the vibration movements of the at least one tube in the second-order vibration mode.

7. The measuring system according to claim 1, wherein, at least one of:

the drive offset corresponds to a distance between an area centroid of the drive cross-sectional area of the at least one tube and an area centroid of the reference cross-sectional area of the at least one tube;

a line of action of the drive force is perpendicular to a normal of a drive cross-sectional area of the at least one tube;

an intersection line of two mutually orthogonal symmetry planes of the at least one tube is within the reference cross-sectional area;

a main inertia axis, perpendicular to the drive force, of the at least one tube is within the reference cross-sectional area of the at least one tube;

the drive offset results from a manufacturing tolerance in the manufacture of the exciter assembly, including tolerances in the positioning of the vibration exciter on the at least one tube and/or tolerances in the positioning of the tube assembly within a transducer protective housing; and the drive offset results from a manufacturing tolerance in the manufacture of the at least one tube.

8. The measuring system according to claim 1, wherein the electronics unit is configured to:

generate the second current component of the drive signal at least intermittently simultaneously with the first current component such that an amplitude of the first current component is adjusted to not be less than an amplitude of the second current component and/or such that an amplitude of the second used current is adjusted to more than 40%, and not less than 50%, of an amplitude of the first current component; and/or adjust the second frequency as a function of the first frequency such that the second frequency is within a frequency setting interval, of which an upper interval limit and/or a lower interval limit and/or a center frequency corresponds to a specified multiple of the first frequency, which is a multiple of the first frequency corresponding to more than 230% of the first frequency and/or less than 300% of the first frequency.

9. The measuring system according to claim 1, wherein the electronics unit is configured to:

simultaneously feed the first and second current components of the drive signal to the vibration exciter for a time interval that is not less than two vibration periods of the first current component and/or more than 10 ms (milliseconds); and/or switch on the second current component during the feeding of the first current component, and to then switch the second current component off after a time interval that is not less than two vibration periods of the first current component and/or more than 1 s (second).

10. The measuring system according to claim 1, wherein the electronics unit includes:

a digital first phase-locked loop adapted to adjust the first frequency; and a digital second phase-locked loop adapted to adjust the second frequency.

11. The measuring system according to claim 10, wherein the electronics unit is configured to adjust a capture range of the second phase-locked loop via at least one output signal of a loop filter of the first phase-locked loop and/or based on the first frequency.

12. The measuring system according to claim 1, further comprising a support frame, wherein the support frame and the tube assembly are fastened to one another in a detachable manner, and wherein the vibration exciter and/or the first and second vibration sensors are partially attached to the support frame.

13. The measuring system according to claim 1, further comprising an electronics protective housing in which the electronics unit is disposed, which electronics protective housing is fastened to a support frame or a transducer protective housing of the transducer and/or is metallic.

14. The measuring system according to claim 1, wherein, apart from the vibration exciter, the transducer does not include any further vibration exciter mechanically connected to the at least one tube.

15. The measuring system according to claim 1, wherein the electronics unit is configured to:

determine, based on the first signal component of at least one of the first and second vibration signals and/or the first current component of the drive signal, at least one first quality value, wherein the first quality value represents a measure of the first modal damping, which is a quality of the first used vibrations or a damping ratio of the first used vibrations, or depends on said first modal damping; and determine, based on the second useful signal component of at least one of the first and second vibration signals and/or the second current component of the drive signal, at least one second quality value, wherein the second quality value represents a measure of the second modal damping, which is a quality of the second used vibrations or a damping ratio of the second used vibrations, or depends on said second modal damping.

16. The measuring system according to claim 1, wherein the electronics unit is configured to:

determine measured values at least provisionally representing mass-flow measured values, at least provisionally representing the mass flow of the measured substance, based on a measurement phase difference, which is a difference between a phase angle of the first signal component of the first vibration signal and a phase angle of the first signal component of the second vibration signal; and determine, based on at least one first signal component and at least one second signal component and/or based on the first and second current components, at least one damping correction value for the measurement phase difference and/or measured values provisionally determined based on said measurement phase difference, such that the damping correction value corresponds to the first and second modal dampings or is a function of the first and second modal dampings and/or such that the damping correction value is subtracted from the measurement phase difference and/or from measured values provisionally determined based on the measurement phase difference.

17. The measuring system according to claim 16, wherein the electronics unit is configured to:

determine, based on the first signal component of at least one of the first and second vibration signals and/or the first current component of the drive signal, a first quality value, wherein the first quality value represents a measure of the first modal damping, which is a quality of the first used vibrations or a damping ratio of the first used vibrations, or depends on said first modal damping;

determine, based on the second useful signal component of at least one of the first and second vibration signals and/or the second current component of the drive signal, a second quality value, wherein the second quality value represents a measure of the second modal damping, which is a quality of the second used vibrations or a damping ratio of the second used vibrations, or depends on said second modal damping; and determine the damping correction value using the first and second quality values such that the damping correction value corresponds to a function of the quality of the second used vibrations or a reciprocal of a damping ratio of the second used vibrations and a second power of a damping ratio of the first used vibrations or a reciprocal of a quality of the first used vibrations.

18. The measuring system according to claim 17, wherein, at least one of:

the damping correction value corresponds depends on the drive offset and/or is a measure of the drive offset;

the damping correction value corresponds to the first and second modal dampings or is a function of the first and second modal dampings such that the damping correction value corresponds to the function of the quality of the second used vibrations or the reciprocal of the damping ratio of the second used vibrations and the second power of the damping ratio of the first used vibrations or the reciprocal of the quality of the first used vibrations;

the damping correction value corresponds to a function of a product of the quality of the first used vibrations and the second power of the quality of the second used vibrations or a product of the reciprocal of the damping ratio of the first used vibrations and the second power of the reciprocal of the damping ratio of the second used vibrations;

an amount of the damping correction value decreases with increasing first modal damping and/or increases with increasing second modal damping;

the damping correction value is proportional to a ratio of a second power of the first modal damping to the second modal damping;

the electronics unit is configured to store the damping correction value in a non-volatile data memory and/or such that the damping correction value is stored as a reference value specific to the measuring system and/or is contained in a measurement function of the measuring system, according to which the measuring system converts the at least one flow parameter to be measured into the respective measured values;

the electronics unit is configured to compare the damping correction value to an initial damping correction value, previously determined under reference conditions and/or during a start-up of the measuring system and/or during a calibration of the measuring system and/or with a structurally identical other measuring system, wherein the initial damping correction value is stored in the electronics unit and/or used as a reference value;

the electronics unit is configured to compare the damping correction value to at least one threshold value specified therefor and representing an out-of-spec transducer and/or an impermissibly large drive offset;

the electronics unit is configured to determine, using the damping correction value, an extent of the drive offset and/or to perform a check of the measuring system; and the electronics unit is configured to perform a diagnosis and/or a recalibration of the measuring system using the damping correction value in a transducer integrated in a tube line system and/or using a separate electronics unit electrically connected to the transducer.

19. The measuring system according to claim 1, wherein the electronics unit is configured to determine, based on at least one of the first and second vibration signals, a first speed value, which represents a first vibration speed of the vibration movements of the at least one tube performing the first used vibrations, and to store the first speed value in a non-volatile data memory.

20. The measuring system according to claim 1, wherein the electronics unit is configured to determine, based on at least one of the first and second vibration signals, a second speed value, which represents a second vibration speed of the vibration movements of the at least one tube performing the second used vibrations, and to store the second speed value in a non-volatile data memory.

21. The measuring system according to claim 1, wherein the electronics unit is configured to determine, based on the drive signal, a digital first current measured value representing the first amplitude of the first current component or an amplitude of an effective value of the first current component, and to store the first current measured value in a non-volatile data memory.

22. The measuring system according to claim 1, wherein the electronics unit is configured to determine, based on the drive signal, a digital second current measured value representing the second amplitude of the second current component or an amplitude of an effective value of the second current component, and to store the second current measured value in a non-volatile data memory.

23. The measuring system according to claim 18, wherein the electronics unit is configured to:

determine, based on at least one of the first and second vibration signals, a first speed value, which represents a first vibration speed of the vibration movements of the at least one tube performing the first used vibrations, and to store the first speed value in the non-volatile data memory;

determine, based on at least one of the first and second vibration signals, a second speed value, which represents a second vibration speed of the vibration movements of the at least one tube performing the second used vibrations, and to store the second speed value in the non-volatile data memory;

determine, based on the drive signal, a digital first current measured value representing the first amplitude of the first current component or an amplitude of an effective value of the first current component, and to store the first current measured value in the non-volatile data memory;

determine, based on the drive signal, a digital second current measured value representing the second amplitude of the second current component or an amplitude of an effective value of the second current component, and to store the second current measured value in the non-volatile data memory; and determine the damping correction value as a function of the first vibration speed, a second power of the second amplitude of the second current component, a reciprocal of the first amplitude of the first current component, and a reciprocal of a second power of the second vibration speed.

24. The measuring system according to claim 18, wherein the electronics unit is configured to:

determine, based on at least one of the first and second vibration signals, a first speed value, which represents a first vibration speed of the vibration movements of the at least one tube performing the first used vibrations, and to store the first speed value in the non-volatile data memory;

determine, based on at least one of the first and second vibration signals, a second speed value, which represents a second vibration speed of the vibration movements of the at least one tube performing the second used vibrations, and to store the second speed value in the non-volatile data memory;

determine, based on the drive signal, a digital first current measured value representing the first amplitude of the first current component or an amplitude of an effective value of the first current component, and to store the first current measured value in the non-volatile data memory;

determine, based on the drive signal, a digital second current measured value representing the second amplitude of the second current component or an amplitude of an effective value of the second current component, and to store the second current measured value in the non-volatile data memory; and determine the damping correction value as a function of the first vibration speed, a second power of the second amplitude of the second current component, a reciprocal of the first amplitude of the first current component, and a reciprocal of a second power of the second vibration speed, using the first and second speed values and the first and second current measured values.

25. The measuring system according to claim 1, wherein:

the first signal components of the first and second vibration signals follow a change in a mass flow of the measured substance conducted in the at least one tube with a change in a measurement phase difference of the first useful signal components, which is a difference between a phase angle of the first useful signal component of the first vibration signal and a phase angle of the first useful signal component of the second vibration signal; and the electronics unit is configured to generate, based on the measurement phase difference of the first useful signal components, mass-flow measured values representing the mass flow.

26. The measuring system according to claim 25, wherein in the electronics unit, a phase-difference-to-measured-value characteristic curve function is configured, according to which the electronics unit determines, based on the measurement phase difference, measured values representing mass-flow measured values representing the mass flow of the measured substance such that the first and second modal dampings are taken into account in the phase-difference-to-mass-flow-measured-value characteristic curve function or that the damping correction value is contained in the phase-difference-to-mass-flow-measured-value characteristic curve function.

27. The measuring system according to claim 26, wherein:

the first and second modal dampings are taken into account in the phase-difference-to-mass-flow-measured-value characteristic curve function or the damping correction value is contained in the phase-difference-to-mass-flow-measured-value characteristic curve function such that, in the phase-difference-to-mass-flow-measured-value characteristic curve function, a product of a second power of the first modal damping and a reciprocal of the second modal damping is taken into account and/or a product from a second power of the reciprocal of the quality of the first used vibrations and the quality of the second used vibrations is contained; and/or the electronics unit is configured to check the phase-difference-to-measured-value characteristic curve function via at least one of the first and second vibration signals and/or the drive signal using the damping correction value.

28. The measuring system according to claim 1, wherein the electronics unit is configured to perform a diagnosis and/or recalibration of the measuring system based on the first signal component and the second signal component of the first and second vibration signals, respectively, and/or the first and second current components of the drive signal in a transducer integrated in a tube line system and/or using a separate electronics unit electrically connected to the transducer.

29. The measuring system according to claim 1, wherein the electronics units includes a non-volatile data memory configured to store digital data without an applied operating voltage.

30. The measuring system according to claim 1, wherein:
the vibration exciter includes a vibration coil including an air coil and an armature; and/or
each of the first and second vibration sensors includes a plunger coil including an air coil and an armature.

31. The measuring system according to claim 1, wherein the vibration exciter includes a magnetic armature, including a permanent magnet, and an air coil through which a magnetic field of the armature flows.

32. The measuring system according to claim 31, wherein:
the magnetic armature is mechanically connected to the at least one tube to form the drive point; and/or
the coil is electrically connected to the electronics unit and is configured to receive the drive signal and to conduct the first and second currents thereof.

33. The measuring system according claim 1, wherein the electronics unit is configured to:
follow a change in a density of the measured substance conducted in the at least one tube with a change in the first frequency of the drive signal; and
generate, based on the first frequency of the drive signal and/or based on the signal frequency of the first signal component of at least one of the vibration signals, density measured values representing the density.

34. The measuring system according claim 1, wherein the electronics unit is configured to generate the drive signal with the second current component during a test interval, the test interval lasting more than 10 ms, limited in time and/or recurrently started, with a sinusoidal having a second frequency.

35. The measuring system according to claim 34, wherein, at least one of:
the test interval lasts for more than 100 ms and not less than 1 s;
the electronics unit is configured to automatically, in a time-controlled manner, start and/or end the test interval; and
the electronics unit is configured to receive and execute one or more commands that start the test interval.

36. The measuring system according claim 1, wherein the tube wall comprises at least one of: a stainless steel, a duplex steel, a super duplex steel, a titanium alloy, a zirconium alloy, and a tantalum alloy.

37. The measuring system according to claim 1, wherein the at least one tube has a caliber, representing is an inner tube diameter, that is more than 0.1 mm.

38. The measuring system according claim 37, wherein, at least one of:
the at least one tube has a caliber-to-tube-length ratio that is more than 0.08 and/or less than 0.25;
the tube length of the at least one tube is more than 200 mm and/or less than 2,000 mm; and
the at least one tube has a caliber greater than 10 mm.

39. The measuring system according to claim 1, wherein, at least of one:
apart from the vibration exciter, the exciter assembly does not include any further vibration exciter connected to the at least one tube;
the vibration exciter is positioned and aligned such that the drive offset is less than 0.5 mm or such that an area centroid of the drive cross-sectional area of the at least one tube corresponds to or coincides with a drive reference point;
each of the first-order and second-order vibration modes of the at least one tube, respectively, has a first vibration node located in the first tube end of the at least one tube and a second vibration node located in the second tube end of the at least one tube;
the at least one tube is curved in sections circular arc-shape and/or V-shaped such that the at least one tube includes a central vertex arc segment and/or such that exactly one main inertia axis of the at least one tube is within the reference cross-sectional area of the at least one tube; and
the at least one tube is straight over the entire tube length such that the three main inertia axes of the at least one tube are within the reference cross-sectional area of the at least one tube and/or such that a center of mass is within the reference cross-sectional area of the at least one tube.

40. The measuring system according claim 1, wherein the tube assembly includes a first tube and at least one second tube, which is in sections curved and/or straight, and/or which is structurally identical to the first tube and/or is at least sectionally parallel to the first tube.

41. The measuring system according claim 40, wherein, at least one of:
the vibration exciter is mechanically connected both partially to the first tube and partially to the second tube;
the vibration exciter is configured to act differentially on the first and second tubes such that the first and second tubes simultaneously perform opposite forced mechanical vibrations of equal frequency;
the vibration exciter is configured to convert electrical power with a temporally variable electrical current into mechanical power such that a temporally variable drive force acts on the second tube at a drive point defined by the vibration exciter on the second tube mechanically connected thereto, wherein the drive force acts simultaneously and/or oppositely to a drive force acting on the first tube at a drive point defined by the vibration exciter on the first tube mechanically connected thereto; and
the vibration exciter is configured to simultaneously convert electrical power fed by the electrical drive signal into forced mechanical vibrations of the first and second tubes such that the first and second tubes simultaneously perform forced mechanical vibrations at the first used frequency and/or at the second used frequency.

42. The measuring system according claim 41, wherein:
the second tube extends with a tube length from a first tube end to a second tube end and includes a lumen, which is enclosed by a tube wall and extends from the first tube end to the second tube end; and

the second tube is configured to be flowed through by measured substance at least in a flow direction from the first tube end to the second tube end, simultaneously with the first tube, while being enabled to vibrate.

43. The measuring system according claim 42, wherein:

the tube assembly includes a first flow divider, which is configured as a line-branching unit, and includes at least two flow openings; and the tube assembly includes a second flow divider, which is structurally identical to the first flow divider and/or is configured as a line-merging unit, and includes at least two flow openings.

44. The measuring system according claim 43, wherein each of the first and second tubes of the tube assembly is respectively connected to each of the first and second flow dividers to define fluidically parallel flow channels such that:

the first tube opens with its first tube end into a first flow opening of the first flow divider and with its second tube end into a first flow opening of the second flow divider; and the second tube opens with its first tube end into a second flow opening of the first flow divider and with its second tube end into a second flow opening of the second flow divider.

45. The measuring system according claim 1, wherein the vibronic measuring system is a Coriolis mass flow measuring device or a Coriolis mass flow/density measuring device.

46. The measuring system according claim 1, wherein the at least one flow parameter is at least one of a mass flow, a volume flow, and a flow rate, and wherein the measured substance is one of a gas, a liquid, and a dispersion.

47. The measuring system according claim 1, wherein the at least one tube is sectionally curved and/or sectionally straight, and/or wherein the tube length is more than 100 mm.

48. The measuring system according claim 1, wherein at least one of:

the electronics unit includes at least one microprocessor;

the first vibration sensor is an electrodynamic vibration sensor;

the first vibration sensor is at least partially mechanically connected to the at least one tube;

the second vibration sensor is an electrodynamic vibration sensor; and the second vibration sensor is at least partially mechanically connected to the at least one tube.

49. The measuring system according claim 1, wherein at least one of:

the vibration exciter is an electrodynamic vibration exciter;

a line of action of the drive force is perpendicular to a normal of a drive cross-sectional area of the at least one tube;

the drive offset is determined with an intact or original transducer; and the vibration node of vibration movements of the at least one tube in the second-order or higher-order vibration mode, formed between two vibration antinodes of said vibration movements and being within the reference cross-sectional area, is nominally located at half the tube length.

50. The measuring system according claim 1, wherein at least one of:

the electronics unit is configured to feed the electrical drive signal to the vibration exciter, at least intermittently, with the sinusoidal second current component simultaneously with the first current component;

the first frequency of the sinusoidal first current component corresponds to the resonance frequency of the odd-order vibration mode;

the first used vibrations are suitable for causing Coriolis forces in the measured substance flowing through the at least one tube with a non-zero mass flow;

the second frequency of the sinusoidal second current component corresponds to the resonance frequency of the even-order vibration mode; and the second used vibrations are suitable for causing Coriolis forces in the measured substance flowing through the at least one tube with a non-zero mass flow.

* * * * *